United States Patent
Yang et al.

(10) Patent No.: US 12,041,597 B2
(45) Date of Patent: Jul. 16, 2024

(54) TRANSMITTING PAYLOADS USING M-SEQUENCES

(71) Applicant: QUALCOMM Incorporated, San Diego, CA (US)

(72) Inventors: Wei Yang, San Diego, CA (US); Peter Gaal, San Diego, CA (US); Yi Huang, San Diego, CA (US); Hwan Joon Kwon, San Diego, CA (US); Krishna Kiran Mukkavilli, San Diego, CA (US); Gokul Sridharan, Sunnyvale, CA (US); Tingfang Ji, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/320,138

(22) Filed: May 13, 2021

(65) Prior Publication Data

US 2021/0360632 A1    Nov. 18, 2021

Related U.S. Application Data

(60) Provisional application No. 63/025,962, filed on May 15, 2020.

(51) Int. Cl.
*H04W 72/04* (2023.01)
*H04L 1/00* (2006.01)
(Continued)

(52) U.S. Cl.
CPC ....... *H04W 72/0466* (2013.01); *H04L 1/0003* (2013.01); *H04L 1/0008* (2013.01); *H04W 72/1263* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 2010/0205235 A1* | 8/2010 | Furuya | H03K 3/84 708/492 |
| 2012/0061469 A1* | 3/2012 | Sonoda | G06F 3/0321 235/454 |

(Continued)

FOREIGN PATENT DOCUMENTS

| | | |
|---|---|---|
| CN | 103858503 A | 6/2014 |
| WO | WO-2016204811 A1 | 12/2016 |

(Continued)

OTHER PUBLICATIONS

Martin Cohn et al., "On Fast M-Sequence Transforms", Internet Citation, vol. IT-23, No. 1, 26, Jan. 1976, pp. 135-138 (Year: 1976).*

(Continued)

*Primary Examiner* — Steve R Young
(74) *Attorney, Agent, or Firm* — Loza & Loza, LLP

(57) ABSTRACT

Aspects relate to technologies and techniques for sequence-based, non-coherent wireless channel transmission of a payload on a physical uplink channel. A transmitter converts information bits of a payload to be transmitted to a decimal integer value that is, in turn, used to generate a modified maximum sequence (m-sequence) based on one or more predetermined parameters such as an m-sequence generating polynomial, a starting location in the sequence, and an initialization. The generated modified m-sequences are modulated using modulation schemes such as π/2 binary phase-shift keying and quadrature phase-shift keying for transmission on the physical uplink channel.

28 Claims, 14 Drawing Sheets

(51) Int. Cl.
*H04W 72/044* (2023.01)
*H04W 72/12* (2023.01)
*H04W 72/1263* (2023.01)
*H04W 72/21* (2023.01)

(56) References Cited

U.S. PATENT DOCUMENTS

| | | | | |
|---|---|---|---|---|
| 2018/0139014 A1* | 5/2018 | Xiong | | H04L 1/1861 |
| 2018/0287844 A1* | 10/2018 | Kim | | H04L 5/005 |
| 2020/0014483 A1* | 1/2020 | Lee | | H04J 13/0025 |
| 2021/0029673 A1* | 1/2021 | Zhang | | H04W 80/02 |
| 2021/0108948 A1* | 4/2021 | Kimura | | G01D 5/2492 |

FOREIGN PATENT DOCUMENTS

| | | | |
|---|---|---|---|
| WO | 2018128867 A1 | 7/2018 | |
| WO | 2019051485 A1 | 3/2019 | |

OTHER PUBLICATIONS

Cohn M., et al., "On Fast M-Sequence Transforms", Internet Citation, vol. IT-23, No. 1, Jan. 26, 1976, (Jan. 26, 1976), pp. 135-138, XP007919571, [Retrieved on Oct. 13, 2011], p. 137, line 9, paragraph r-line 15.
International Search Report and Written Opinion—PCT/US2021/032478—ISA/EPO—Aug. 31, 2021.
Qualcomm Incorporated: "Potential Coverage Enhancement Techniques for PUCCH", 3GPP Draft, 3GPP TSG-RAN WG1 Meeting #103e, R1-2009360, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 28, 2020 (Oct. 28, 2020), XP051948031, 17 Pages, Retrieved from the Internet: URL: https://ftp.3gpp.org/tsg_ran/WG1_RL1/TSGR1_103-e/Docs/R1-2009360.zip. R1-2009360/R1-2009360 Potential Coverage Enhancement Techniques for PUCCH.docx [Retrieved on Oct. 28, 2020] the whole document.

* cited by examiner

| Order n | Generating polynomial |
|---|---|
| 3 | $D^3+D^1+1$ or $D^3+D^2+1$ |
| 4 | $D^4+D^1+1$ or $D^4+D^3+1$ |
| 5 | $D^5+D^2+1$ or $D^5+D^3+1$ |
| 6 | $D^6+D^1+1$ or $D^6+D^5+1$ |
| 7 | $D^7+D^1+1$ or $D^7+D^3+1$ or $D^7+D^4+1$ or $D^7+D^6+1$ |
| 8 | $D^8+D^4+D^3+D^2+1$ or $D^8+D^5+D^3+D^1+1$ |
| 9 | $D^9+D^4+1$ or $D^9+D^5+1$ |
| 10 | $D^{10}+D^3+1$ or $D^{10}+D^7+1$ |
| 11 | $D^{11}+D^2+1$ or $D^{11}+D^9+1$ |
| 12 | $D^{12}+D^6+D^4+D^1+1$ or $D^{12}+D^6+D^5+D^3+1$ |

FIG. 7

TRANSMITTING PAYLOADS USING M-SEQUENCES

CROSS REFERENCE TO RELATED APPLICATIONS

This application claims priority to and the benefit of U.S. Provisional Application No. 63/025,962 filed in the U.S. Patent and Trademark Office on May 15, 2020, the entire contents of which are incorporated herein by reference as if fully set forth below in its entirety and for all applicable purposes.

TECHNICAL FIELD

The technology discussed below relates generally to wireless communication networks, and more particularly, to technologies and techniques for transmitting small payloads such as uplink control information (UCI) using modified maximum sequences (M-sequences).

INTRODUCTION

In 5G new radio (NR) wireless communication networks, various control information and data are transmitted on uplink (UL) transmissions (i.e., transmissions from a user equipment (UE) to a network node such as a gNodeB (gNB)). In particular, UL transmissions include uplink control information (UCI), which is transmitted using various UCI payload sizes in the 5G NR uplink and is typically carried by a physical uplink control channel (PUCCH). In cases where the number of UCI bits exceeds two bits, channel coding is used to provide error protection and correction for the UCI. In a particular example, if the payload size is greater than 2 bits and less than or equal to 11 bits, a Reed-Muller code is typically used to provide error correction.

Additionally, in many instances, the PUCCH may include a demodulation reference signal (DMRS) to estimate the radio channel in a receiver (e.g., a gNB). This channel estimation is also known as coherent communication as specific reference signaling in a transmission is used for channel estimation. In low signal to noise ratio (SNR) scenarios, such as when a UE is at the edge of a cell, the quality of the channel estimation limits the performance of PUCCH reception, and therefore the coverage.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to an example, a method of wireless communication in a user equipment (UE) in a communications network is disclosed. The method includes generating a modified maximum sequence (m-sequence) from information bits of a payload to be transmitted based on one or more predetermined parameters. Further, the method includes modulating the modified m-sequence based on a modulation scheme to derive a modulated modified m-sequence, and transmitting the modulated modified m-sequence in a wireless channel.

In another example, a user equipment (UE) is disclosed including a transceiver, a memory, and a processor communicatively coupled to the transceiver and the memory. The processor and the memory are configured to generate a modified maximum sequence (m-sequence) from information bits of a payload to be transmitted based on one or more predetermined parameters, modulate the modified m-sequence based on a modulation scheme to derive a modulated m-sequence, and transmit, with transceiver, the modulated modified m-sequence in a wireless channel.

According to yet another example, a method of wireless communication in a base station in a wireless communication network is disclosed. The method includes receiving a modified maximum sequence (m-sequence) signal from a user equipment (UE) and zero padding the received modified m-sequence to increase the length of the received sequence to a length $2^n$, where n denotes the order of a polynomial that generated the modified m-sequence to derive a zero padded m-sequence. Further, the method includes permuting the zero padded m-sequence, fast Hadamard transforming the permuted zero-padded m-sequence, and extracting correlation metrics based on a result of the fast Hadamard transform.

In yet a further example, a base station is disclosed including a transceiver, a memory, and a processor communicatively coupled to the transceiver and the memory. The processor and the memory are configured to receive a modified m-sequence based signal from a user equipment (UE), and zero pad the received modified m-sequence in the m-sequence to increase the length of the received sequence to a length $2^n$, where n denotes the order of a polynomial that generated the m-sequence to derive zero padded m-sequence. Additionally, the processor and memory are configured to permute the zero padded m-sequence, fast Hadamard transform the permuted zero-padded m-sequence, and extract correlation metrics based on a result of the fast Hadamard transform.

These and other aspects of the invention will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

BRIEF DESCRIPTION OF THE DRAWINGS

FIG. 7 illustrates a table of exemplary generating polynomials that may be utilized by an m-sequence generator according to some aspects.

DETAILED DESCRIPTION

Figure 1:
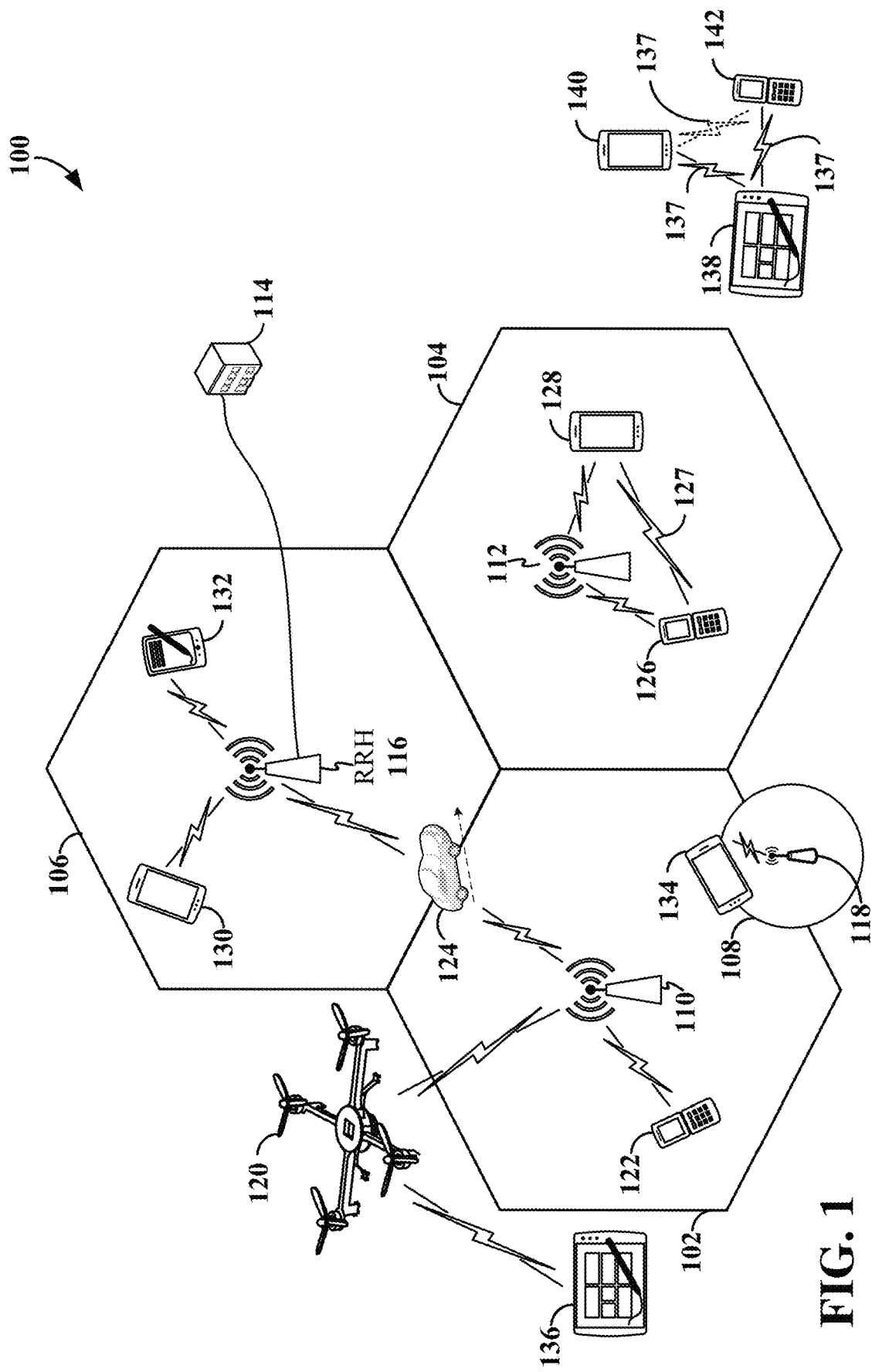
FIG. 1 is an illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or 1-R2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Various aspects of the disclosure relate to the relate to technologies and techniques for sequence-based, non-coherent wireless channel transmission of a payload. A transmitter converts information bits of a payload to be transmitted to be transmitted to a decimal integer value that is, in turn, used for generating a truncated maximum sequence (m-sequence) and one or more predetermined parameters such as an m-sequence generating polynomial, a starting location in the sequence, and an initialization. The generated m-sequences are modulated using modulation schemes such as $\pi/2$ binary phase-shift keying and quadrature phase-shift keying.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some nonlimiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 2:
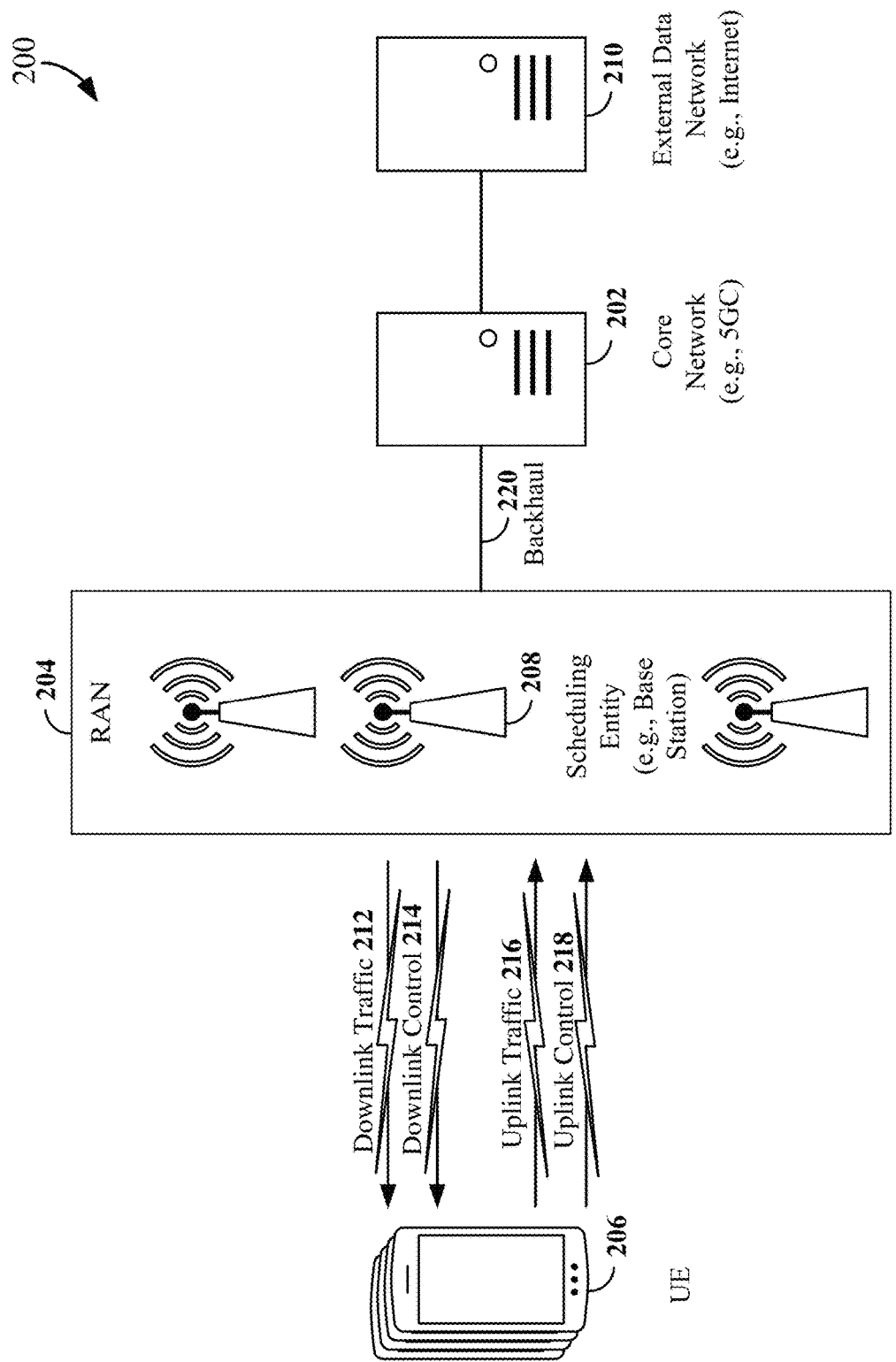
FIG. 2 is an illustration of an example of a radio access network according to some aspects.

FIG. 2, as another illustrative example without limitation, illustrates various aspects with reference to a schematic of a wireless communication system 200. The wireless communication system 200 includes three interacting domains: a core network 202, a radio access network (RAN) 204, and a user equipment (UE) 206. By virtue of the wireless communication system 200, the UE 206 may be enabled to carry out data communication with an external data network 210, such as (but not limited to) the Internet.

The RAN 204 may implement any suitable wireless communication technology or technologies to provide radio access to the UE 206. As one example, the RAN 204 may operate according to 3rd Generation Partnership Project (3GPP) New Radio (NR) specifications. As another example, the RAN 204 may operate under a hybrid of 5G NR and Evolved Universal Terrestrial Radio Access Network (eUTRAN) standards, often referred to as LTE, such as in non-standalone (NSA) systems including EN-DC systems. The 3GPP also refers to this hybrid RAN as a next-generation RAN, or NG-RAN. Additionally, many other examples may be utilized within the scope of the present disclosure.

As illustrated in FIG. 2, the RAN 204 includes a plurality of base stations 208. In different technologies, standards, or contexts, the base stations 208 may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The RAN 204 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Wireless communication between the RAN 204 and a UE 206 may be described as utilizing an air interface. Transmissions over the air interface from a base station (e.g., base station 208) to a UE (e.g., UE 206) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 206) to a base station (e.g., base station 208) may be referred to as uplink (UL) transmissions. In accordance with further aspects of the present disclosure, the term uplink may refer to a point-to-point transmission originating at a UE (e.g., UE 206).

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 206, which may be a scheduled entity, may utilize resources allocated by the scheduling entity 208.

As illustrated in FIG. 2, a base station or scheduling entity 208 may broadcast downlink traffic 212 to one or more UEs (e.g., UE 206). Broadly, the base station or scheduling entity 208 may be configured as a node or device responsible for scheduling traffic in a wireless communication network, including the downlink traffic 212 and, in some examples, uplink traffic 216 from the UE 206 to the scheduling entity 208. The UE 206 may be configured as a node or device that also receives downlink control information 214, including but not limited to scheduling information (e.g., a grant), synchronization or timing information, or other control information from another entity in the wireless communication network such as the scheduling entity 208. Furthermore, the UE 206 may send uplink control information 218 to the base station 208 including but not limited to scheduling information (e.g., grants), synchronization or timing information, or other control information.

In general, base stations 208 may include a backhaul interface for communication with a backhaul portion 222 of the wireless communication system. The backhaul 222 may provide a link between a base station 208 and the core network 202. Further, in some examples, a backhaul interface may provide interconnection between the respective base stations 208. Various types of backhaul interfaces may be employed, such as a direct physical connection, a virtual network, or the like using any suitable transport network.

The core network 202 may be a part of the wireless communication system 200, and may be independent of the radio access technology used in the RAN 204. In some examples, the core network 202 may be configured according to 5G standards (e.g., 5GC). In other examples, the core network 202 may be configured according to a 4G evolved packet core (EPC), or any other suitable standard or configuration.

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 206, which may be a scheduled entity, may utilize resources allocated by the base station or scheduling entity 208.

Base stations are not the only entities that may function as a scheduling entity. That is, in some examples, a UE may function as a scheduling entity, scheduling resources for one or more scheduled entities (e.g., one or more other UEs). In other examples, two or more UEs (e.g., UEs 138 and 140 in FIG. 1 or UE 206 in FIG. 2) may communicate with each other using sidelink signals such as 137 without conveying that communication through a base station (e.g., base station 112 or 208) and without necessarily relying on scheduling or control information from a base station. In some examples, the UE 138 is functioning as a scheduling entity or an initiating (e.g., transmitting) sidelink device, and UE 140 may function as a scheduled entity or a receiving sidelink device. For example, the UE 138 may function as a scheduling entity in a device-to-device (D2D) system, peer-to-peer (P2P) system, vehicle-to-vehicle (V2V) network, a vehicle-to-everything (V2X) network, and/or in a mesh network.

For example, in D2D systems, two or more UEs (e.g., UEs 138 and 140 in FIG. 1) may communicate over a direct link with one other without traversing a base station (e.g., base station 112 or 208). For example, the UEs 138 and 140 may communicate using narrow directional beams in the FR2 band (e.g., mmWaves). Here, D2D communication may refer to sidelink communication or relaying communication utilizing sidelink signals. In various aspects of the disclosure, a D2D relay framework may be included within a cellular network to facilitate relaying of communication to/from the base station 112 via D2D links (referred to herein as sidelinks (e.g., 127 or 137 in FIG. 1). For example, one or more UEs (e.g., UE 138) within the coverage area of the base station 112 may operate as relaying UEs to extend the coverage of the base station 112 or to improve the transmission reliability to one or more UEs (e.g., UE 140), and/or to allow the base station 112 or 208 to recover from a failed UE link due to, for example, blockage or fading.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
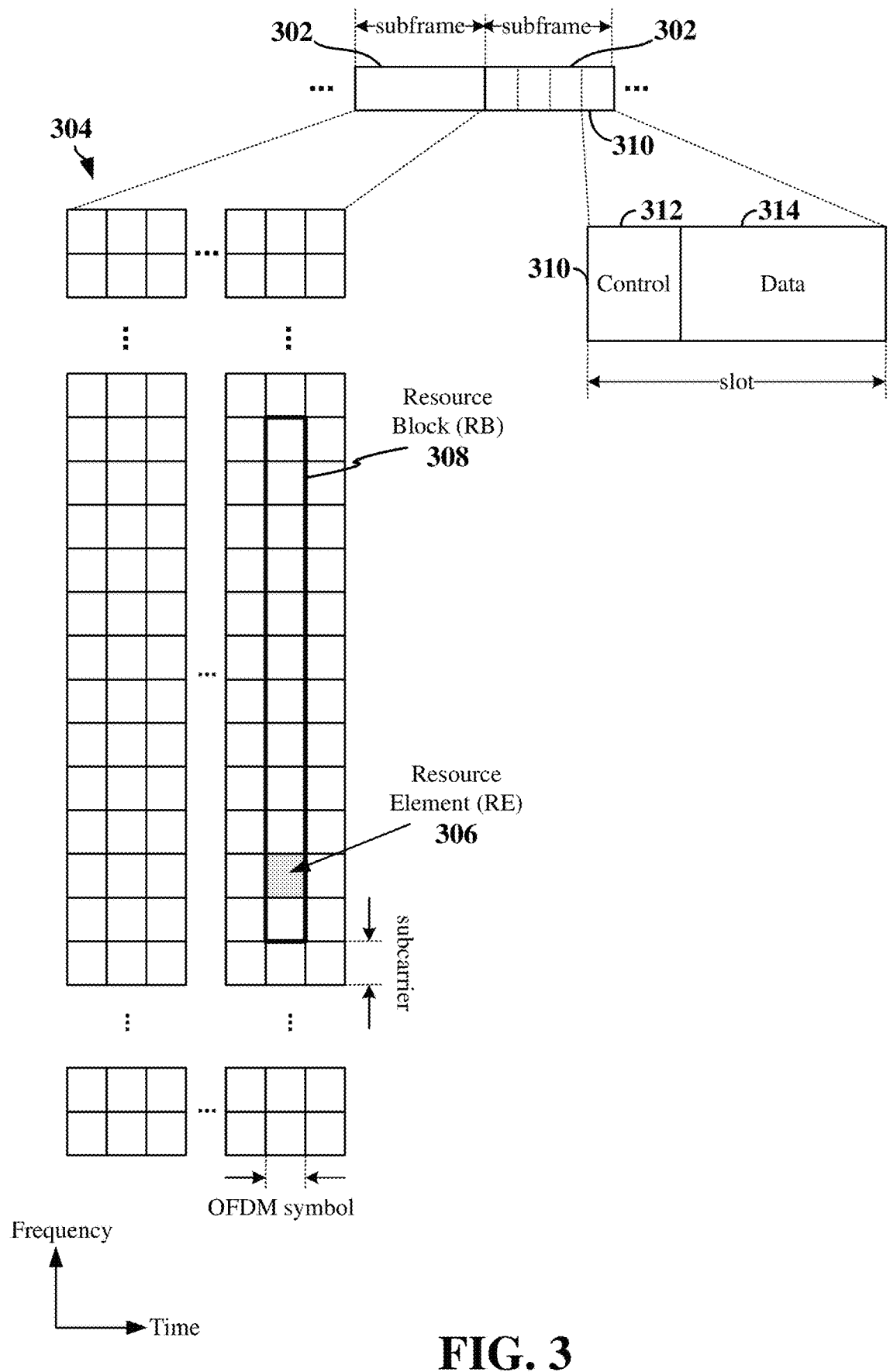
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex quantity representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 4, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH or PUCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS) or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 4 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PBCH may further include a master information block (MIB) that includes various system information, along with parameters for decoding a system information block (SIB). The SIB may be, for example, a SystemInformation-Type1 (SIB1) that may include various additional system information. Examples of system information may include, but are not limited to, subcarrier spacing, system frame number, cell bar indication, a list of common control resource sets (CoreSets) (e.g., PDCCH CoreSet0 or CoreSet1), a list of common search spaces, a search space for SIB1, a paging search space, a random access search space, and uplink configuration information.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH) and/or a Random Access Channel (RACH). The RACH may be used, for example, in a random access procedure during initial access of the uplink. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

As mentioned before, when the SNR of a transmission is low, such as in the example of a UE at the edge of a cell, the quality of the channel estimation at a receiver is limited. In the case of PUCCH reception at a gNB, for example, a low SNR yielding a lower quality channel estimation limits the performance of PUCCH reception, which in turn affects coverage. In order to improve coverage, sequence-based non-coherent transmission may be used instead a channel-coding based scheme, for example. In particular, a transmitter may map a k number of information bits to a sequence from a set of base sequences of a cardinality $2^k$. A receiver of such transmissions may then perform a sequence detection from among the known set of base sequences, and thereby recover the information bits based on the detected sequence.

Figure 4:
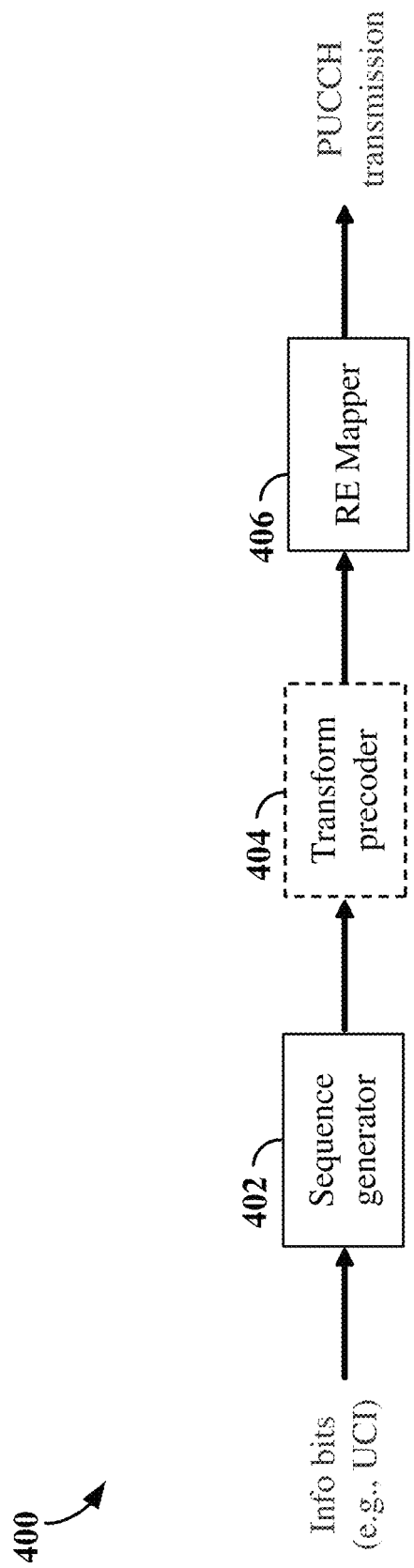
FIG. 4 is a block diagram illustrating an apparatus employing sequence generation for transmissions according to some aspects.

FIG. 4 illustrates a block diagram of an apparatus 400 and associated processes implementable in a transmitter for forming or generating a transmission using bit sequences. In particular, the example of FIG. 4 illustrates formation of a PUCCH transmission, but the processes of FIG. 4 are applicable to other transmissions as well, particularly in situations of small payloads and where the SNR is low. For example, the processes of FIG. 4, and more generally the methodology disclosed herein, may be applied to scenarios such as PDCCH transmissions (i.e., a downlink control channel), PUSCH transmissions (i.e., uplink data transmissions), wake-up signals (i.e., wake up signals over the downlink), sidelink communications, and random access communication (e.g., a physical random access channel (PRACH)).

As illustrated in FIG. 4, a number of information bits (e.g., a k number of information bits), such a uplink control information (UCI), are input to a sequence generator 402 where the information bits are used to generate a sequence such as through mapping the bits to a sequence having a cardinality of $2^k$. Additionally, the apparatus 400 may include an optional transform precoder 404 that precodes the generated sequence for transmission, such as particular transform precoding used in 5G NR including a discrete Fourier transform (DFT). In particular, the transform precoder 404 may be used to spread the data to reduce the PAPR (Peak-to-Average Power Ratio) of the transmission waveform, such as transforming to a DFT-s-OFDM waveform as used in some UL transmissions in 5G NR. Moreover, the apparatus 400 includes a mapper 406 (or RE mapper, in particular) that maps the sequence to subcarriers or, in other words, resource elements (RE) in a transmission frame or subframe, such as was illustrated in FIG. 3, and, in particular, within REs for a PUCCH transmission in this example. A receiver of the transmission may then perform a sequence detection from the set of base sequences, and recover the information bits based on the detected sequence.

In a particular implementation, the sequence generator 402 in FIG. 4 may be configured to employ maximum length sequences or "m-sequences" (or "MLS") for non-coherent transmissions. The use of m-sequences in transmissions allows a receiver of such transmissions to utilize a fast Hadamard transformation for sequence detection, for example, which is of low complexity.

As a background of m-sequences, it is noted that such sequences are a class of binary sequences that are pseudo-random and may be generated using a linear feedback shift register (LFSR), such as the shift register illustrated in FIG. 6, which will be explained in more detail later. An m-sequence has a period of $2^n-1$, where n denotes the length of the shift register (or a memory). Thus, the m-sequence will repeat itself after $2^n-1$ elements or samples. Of further note, the value n is also known as the order of the m-sequence.

In mathematical terms, a set of m-sequences may be represented by a generator polynomial such as the following polynomial equation:

$$x^n + a_{n-1}x^{n-1} + \ldots + a_1 x + 1 \quad (1)$$

where $(a_{n-1}, \ldots, a_1)$ are binary coefficients. From the polynomial shown in equation (1) above, an m-sequence can be generated by the following recursive relationship:

$$x(i+n) = (a_{n-1}x(i+n-1) + \ldots + a_1 x(i+1) + x(i)) \bmod 2 \quad (2)$$

with some non-zero initialization such as $[x(n-1), \ldots, x(1), x(0)] = [0, \ldots, 0, 1]$ with i (or d in other examples herein) denoting being some start position. The initialization is non-zero because m-sequences are periodic and the linear shift registers cycle through every possible binary value with the exception of the zero vector. Thus, the registers can be initialized to any state that is non-zero.

A set of $2^n - 1$ sequences may be obtained by taking different segments of the generated sequence in equation (2) above at $x(0)$, $x(1)$, and so forth. To generalize, a $k^{th}$ sequence in the set can be obtained by taking $[x(k-1), x(k), \ldots, x(k+L-2)]$, where $L = 2^n - 1$.

As an example of the generation of an m-sequence having an order of 3 (i.e., n=3), a third order polynomial $x^3 + x + 1$ may be used. Applying equation 2 above, this polynomial will define the recursion as $x(n+3) = (x(n+1) + x(n)) \bmod 2$. With an initialization of $[x(0)\ x(1), x(2)] = [1,0,0]$, for example, an x sequence may be generated as the following repeating seven bit sequence:

1001011, 1001011, . . . .

Given different starting positions of d=0, 1, . . . , 6, seven different seven-bit length subsequences may be generated based on the third order polynomial assumed above. For example, the following seven bit long m-sequences may be generated:

```
1 0 0 1 0 1 1
0 0 1 0 1 1 1
0 1 0 1 1 1 0
1 0 1 1 1 0 0
0 1 1 1 0 0 1
1 1 1 0 0 1 0
1 1 0 0 1 0 1
```

Accordingly, it may be seen from the discussion above that an m-sequence may be uniquely determined by (1) the polynomial; (2) the initialization; and (3) the starting location.

In application to sequence generation for wireless transmissions, a sequence generator (e.g., generator 402), may be configured to use an m-sequence as the base sequence for a sequence-based transmission, such as a PUCCH transmission. In a particular aspect, the sequence generator may be configured generate a modified m-sequence where the modification may be either a truncation of the m-sequence or a repetition of the sequence (i.e., extending the sequence from a period of $2^n - 1$ to more than $2^n - 1$ by repeating parts of the sequence). In further aspects, modification of the m-sequences may include sub-sampling involving selecting a subset of sequences from a set of $2^n - 1$ sequences, completion by adding an all-zero or an all-one sequence, or scrambling, which will be discussed in more detail later.

Concerning truncation, in particular, in aspect an m-sequence is truncated, reduced, or trimmed through the use of one of a number of particular modulation schemes, as will be explained further below. The m-sequence is truncated to a desired length that is determined by the number of resources available for transmission of the information. The desired length further depends on the modulation format. If the modulation is QPSK, as one example, the m-sequence is truncated to a length 2L, where L is the number of resource elements in the resource. If π/2 BPSK modulation is used, the length of the m-sequence is truncated to length L. By using a truncated m-sequence for sequence-based transmissions for non-coherent transmissions, this allows for better coverage in low SNR conditions and reduces the complexity for correlation procedures at a receiver.

Figures 5A, 5B:
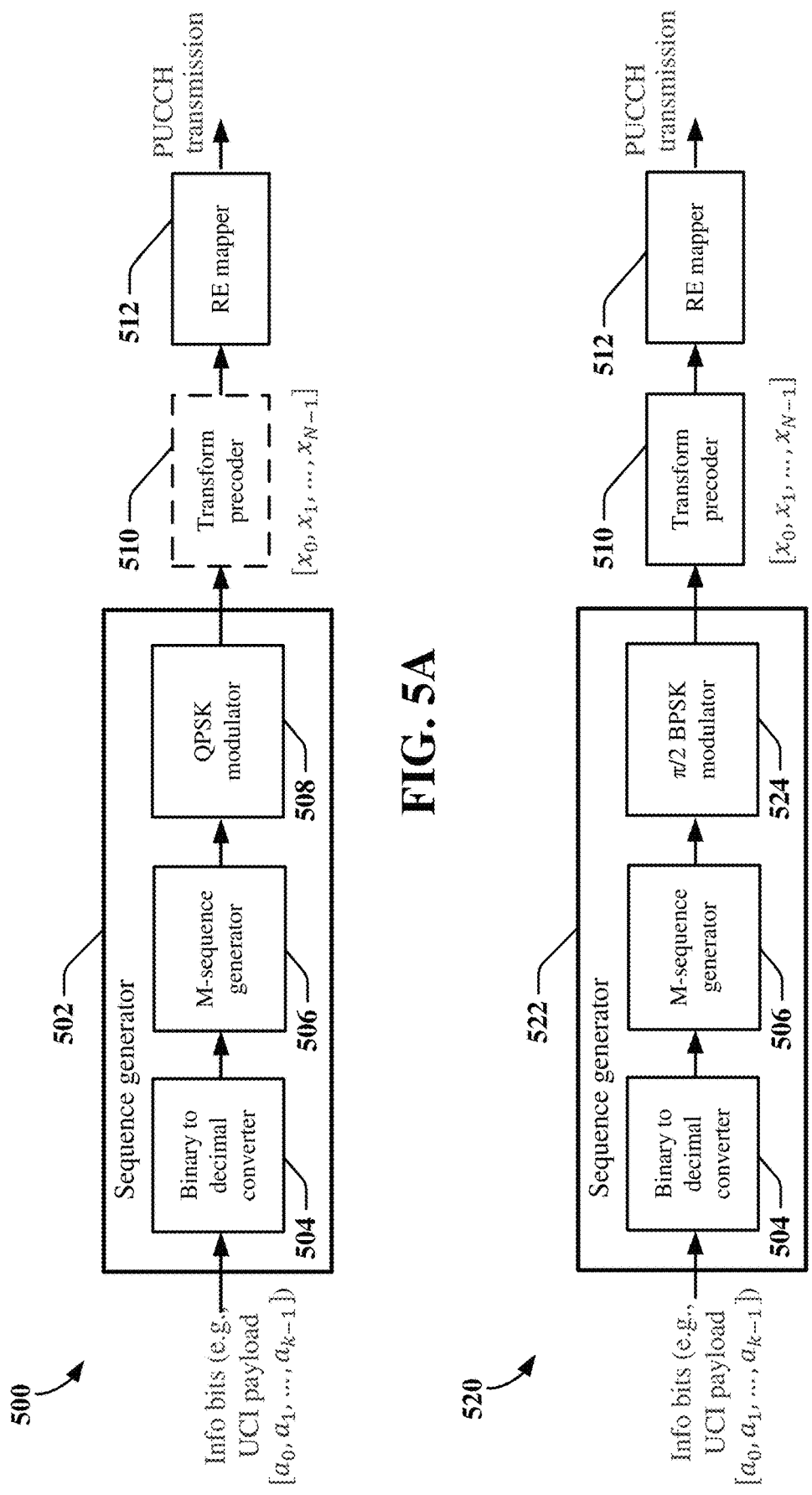
FIG. 5A is a block diagram illustrating another apparatus employing m-sequence generation for transmissions according to some aspects.
FIG. 5B is a block diagram illustrating yet another apparatus employing m-sequence generation for transmissions according to some aspects.

FIGS. 5A and 5B are block diagrams respectively illustrating apparatus 500 and 520 employing m-sequence generation for transmissions according to some aspects. Apparatus 500 in FIG. 5A includes a sequence generator 502 configured to generate sequences used for noncoherent transmission of signals such as PUCCH including a UCI payload. The sequence generator 502 includes a binary to decimal converter 504, an m-sequence generator 506 and a quadrature phase-shift keying (QPSK) modulator 508. It is noted that since m-sequence generation is based on a decimal value, the input payload information, which is typically a binary sequence such as a UCI payload, is converted to a decimal integer value d with the binary to decimal converter 504. For example, if the bits input are 001, the conversion is an integer value of 1, or if the bits input are 101, the conversion is an integer value of 5. It is noted that if the number of payload bits input to the sequence generator 502 is some value k, the maximum decimal integer value would be $2^k - 1$. For example, if k=3, the maximum integer value (i.e., d) would be 7. It is noted that the decimal integer value d is the same value as discussed before and may be starting position for the m-sequence to be generated.

After conversion to the decimal integer d, the m-sequence generator 506 is configured to generate an m-sequence based on predetermined parameters including a polynomial, an initialization, and a starting position or location. Additionally, the m-sequence generator 506 may be configured to use segments of the m-sequence based on the decimal integer d and a predetermined offset value do.

In an example, it is noted that the desired sequence length may be represented as N and the sequence may be represented with the following equation:

$$[x_0, x_1, \ldots, x_{N-1}] = [x(d+d_0), x(d+d_0+1), \ldots, x(d+d_0+N-1)] \quad (3)$$

Additionally, in other aspects, the initialization of the m-sequence may be either $[1, 0, 0, \ldots, 0]$ or $[0, 0, \ldots, 0, 1]$.

Further, it is noted that the result of the m-sequence generator 506 is a binary m-sequence, as was discussed earlier. However, when modulating for transmission, such as for PUCCH transmission, the sequence may be considered as a complex sequence for modulation. Accordingly, the sequence generator 502 includes complex modulation accomplished according to a predetermined modulation scheme. In the example of FIG. 5A, the modulation scheme is a quadrature phase-shift keying (QPSK) modulation effectuated by QPSK modulator 508 to output a complex sequence $[x_0, x_1, \ldots, x_{N-1}]$. This modulated m-sequence may then optionally be transform precoded by transform precoder 510 and mapped to subcarriers or REs by RE mapper 512 for output of the PUCCH transmission.

In the example of FIG. 5B, it is noted that the apparatus 520 includes the same elements as apparatus 500 except that sequence generator 522 utilizes a different modulation scheme from sequence generator 502; namely π/2 binary phase-shift keying (BPSK) modulation as shown by π/2 BPSK modulator 524.

Concerning the choice of when to use a particular modulation scheme, it is noted that π/2 BPSK modulation tends to have a smaller peak to average power ratio (PAPR) and thus may afford better performance when a UE or scheduled entity is transmitting at full power. On the other hand, when a UE or scheduled entity in not transmitting at full power, QPSK modulation may afford better performance. This is because with QPSK, the modulated tones convey more information (i.e., two bits instead of one bit for BPSK modulation) and, thus, will be able to transmit the sequences in less time and with less tones. In other aspects, it is noted the network (e.g., RAN 204 in FIG. 2) may configure the UE or scheduled entities concerning whether QPSK or π/2 BPSK modulation is used. In still other aspects, it noted that other modulation schemes may be applicable with m-sequence generation including quadrature amplitude modulation (i.e., M-QAM such as 16 QAM, 64 QAM, 256 QAM, etc.) and phase shift keying modulation (i.e., M-PSK such as 8-PSK, 16 PSK, etc.). Also, the network may configure the do offset value used for m-sequence generation by the m-sequence generator 506. This configuration may be accomplished by RRC signaling from a base station or gNB to UE's in the network, or be a predetermined or an a priori established value for a network, which is a set configuration in the UEs for the network.

With regard to which order of polynomial expression is to be used by the sequence generators 502 or 522 (an m-sequence generator 506, in particular), various examples are possible. In a first example, in order to convey k bits, m-sequences of order k are used plus an additional sequence (e.g., an all zero or an all one sequence). As discussed above, there are only a $2^k-1$ number of m-sequences for an order k polynomial. Accordingly, since a $2^k$ number of sequences are needed to convey the k bits, an extra sequence is added to the set of m-sequences. Of further note, the offset value here is set to zero (i.e., $d_0=0$) as the full number of $2^k-1$ m-sequences is being used.

In another example, in order to convey k bits, m-sequences of order k+1 may be utilized. As there are $2^{(k+1)}-1$ number of m-sequences with a polynomial of order k+1, there are more available m-sequences than are needed to convey k bits (i.e., a $2^k$ number of sequences). Accordingly, a subset of $2^k$ m-sequences from the $2^{(k+1)}-1$ number of m-sequences may be selected, where the subset is determined by the offset value do. In this case, the offset value do can be either configured by the network (e.g., a gNB) or can be predetermined or specified a priori where scheduled entities or UEs are preconfigured with the offset value.

In yet another example, in order to convey k bits, m-sequences of order $k_{max}$ may be used, where $k_{max} \geq k$ and is an integer independent of the value of k. In this case, in order to select $2^k$ sequences from the set of $2^{k_{max}}-1$ m-sequences, a subsequence starting from $x(d+d_0)$ may be utilized. Alternatively, for a given d, a subsequence starting from $x(\eta \cdot d + d_0)$ may be used where $\eta=1, 2, 4, \ldots$ (i.e., a power of 2 sequence).

Figure 5C:
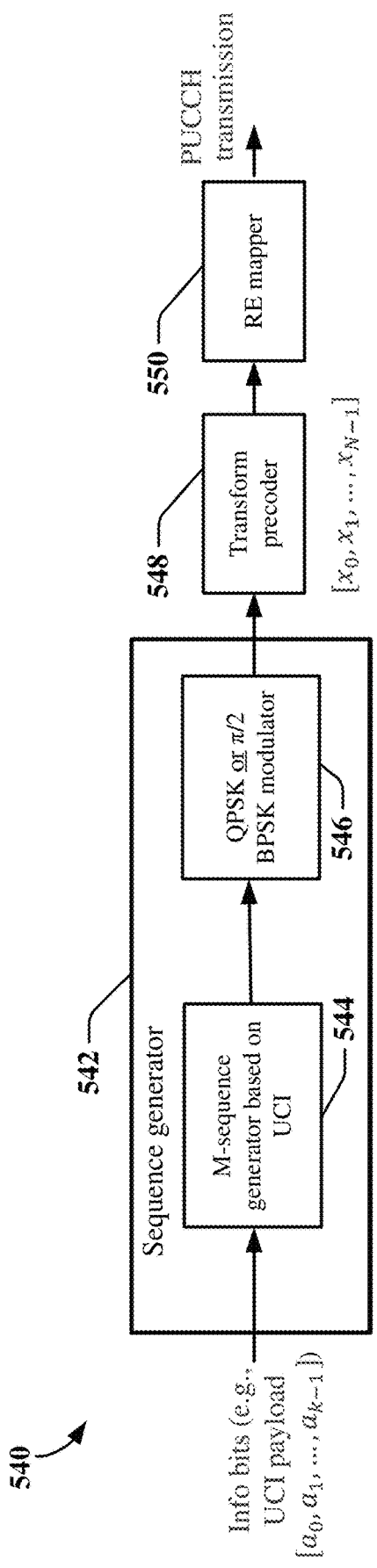
FIG. 5C is a block diagram illustrating still another apparatus employing m-sequence generation for transmissions according to some aspects.

FIG. 5C illustrates another exemplary apparatus 540 utilizing m-sequence generation for transmissions, such as UCI transmissions in a PUCCH. In this example, the apparatus 540 does not utilize the binary to decimal conversion (e.g., convertors 504) found in the examples of FIGS. 5A and 5B. Rather, the apparatus 540 includes a sequence generator 542 that includes an m-sequence generator 544. Generator 544 determines an m-sequence based on the input UCI payload (e.g., information bits corresponding to a binary payload) by initializing the m-sequence with the binary payload (i.e., information bits of a payload to be transmitted). In this particular case, the value d is set to zero (i.e., d=0). Thus, the truncated m-sequence as determined from equation (3) above would be $[x_0, x_1, \ldots, x_{N-1}]=[x(d_0), x(d_0+1), \ldots, x(d_0+N-1)]$, where N is the length of the desired sequence, and the sequence $x(0), x(1), \ldots$, is initialized according to relationships $[x(k-1), \ldots, x(1), x(0)]=[a_{k-1}, \ldots, a_0]$ or $[x(k-1), \ldots, x(1), x(0)]=[a_0, a_{k-1}]$. A difference between the processes of FIGS. 5A and 5B and the process of FIG. 5C is that the offset used to select the portion of the m-sequence does not depend on the UCI payload. In other words, a fixed offset value do will be used to generate all of the truncated m-sequences. Dependency on the binary payload (e.g., the UCI payload) is conveyed through the initialization of the m-sequence. In a further aspect, it is noted that the apparatus in FIG. 5C allows for initialization of the m-sequence with all-zero vectors (i.e., if the UCI payload is all zeros). The resulting m-sequence will also be an all zero sequence.

Figure 6:
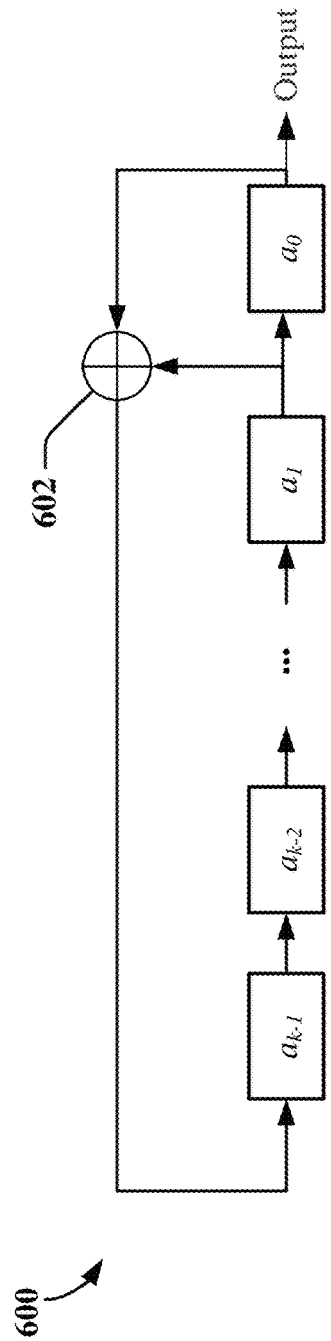
FIG. 6 is a block diagram illustrating an exemplary linear feedback shift register that may be utilized in an m-sequence generator according to some aspects.

Of further note, the m-sequence generator 506 in the apparatus of FIG. 5A, 5B, or FIG. 5C may be configured to utilize a linear feedback shift register (LFSR) 600 as exemplified in FIG. 6. As shown in this example, the LFSR 600 has a register length of k bits (i.e., registers $a_0$ through $a_{k-1}$). The outputs of registers $a_0$ and $a_1$ are input to a modulo-2 summation or adder 602, the result of which is then fed back to the most significant bit at register $a_{k-1}$ during a next shift.

When generating the m-sequences, it is also noted that exemplary polynomials in the form of equation (1) above may be utilized for each particular polynomial order. FIG. 7 illustrates a table or list 700 of exemplary generating polynomials that may be utilized by an m-sequence generator (e.g., 506) according to some aspects. As shown, the polynomials shown using the variable "D" are for orders 3 to 12, although the disclosure is not necessarily limited to just these orders.

According to further aspects, when the presently disclosed methodologies are used in a multi-cell operation, the scheduled entities or UEs in different cells may use the same set of base sequences. Accordingly, in order to mitigate interference, a UE may scramble the generated sequences with a cell specific scrambling sequence or a scrambling ID specific sequence that pertains to a scrambling ID for a specific cell in order to randomize the transmissions and thereby reduce interference.

Figure 8:
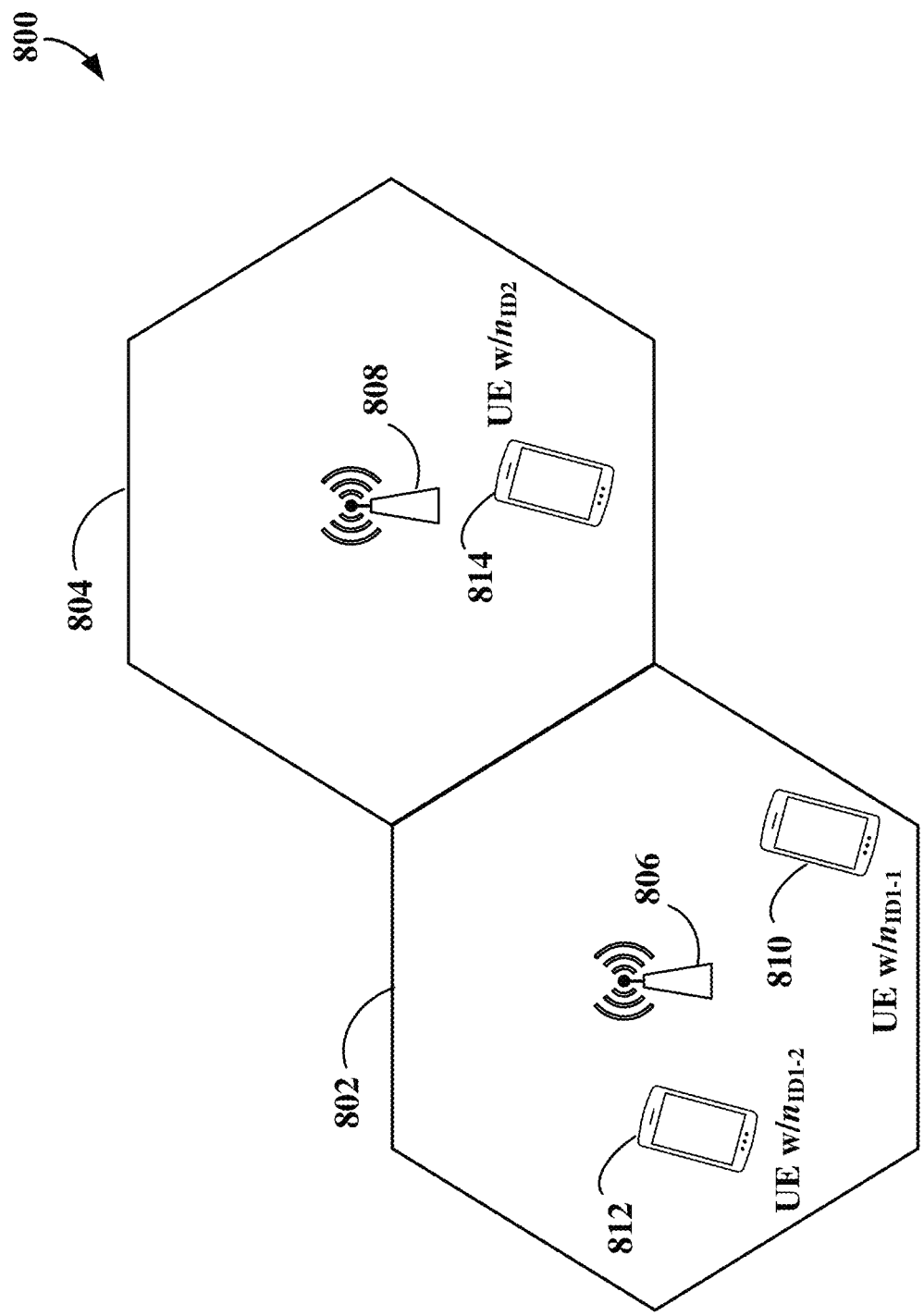
FIG. 8 is a diagram of a cellular network employing scrambling IDs according to some aspects.

FIG. 8 illustrates an exemplary communication system having at least two cells 802 and 804 and associated base stations or gNBs 806 and 808. This diagram is used to illustrate that each UE may have an assigned scrambling ID n (which is not related to the values N or n as used above), and that scrambling ID may be used for determining a scrambling sequence for scrambling the modulated m-sequences. The scrambling sequence may be used to mitigate both inter-cell interference as well as intra-cell interference according to various aspects. In the case of inter-cell interference, it is noted that a UE 810 or a UE 812 in cell 802 may utilize a first scrambling ID $n_{ID1}$ that is different from a second scrambling ID $n_{ID2}$ used by a UE 814 in another cell 804. These different cell-specific scrambling IDs are then used to scramble the modulated m-sequences for avoiding inter-cell interference between transmissions from UEs 810 and/or 812 in a first cell (i.e., cell 802) and UE 814 in a second cell (i.e., cell 804).

Furthermore, in other aspects each UE within a cell may utilize different scrambling sequences or IDs to avoid intra-cell interference. As further illustrated in FIG. 8, one UE 810 in cell 802 may have a unique scrambling ID $n_{ID1-1}$ in generating a scrambling sequence and another UE 812 in the same cell 802 may utilize another scrambling ID $n_{ID1-2}$ in generating a different scrambling sequence. Thus, these different scrambling sequences may help to mitigate intra-cell interference for UEs utilizing the same m-sequences.

Still further, the scrambling of the modulated m-sequence may be dependent upon the type of modulation being used by the sequence generator (e.g., 502 or 522 in FIGS. 5A and 5B). As an example, if the m-sequence is π/2 BPSK modulated, the m-sequence may be scrambled with another cell-specific generated binary sequence of equal length. On the other hand, if the m-sequence is QPSK modulated, then the QPSK sequence may be scrambled with another QPSK sequence of equal length. In other aspects, it is noted that for both the QPSK and π/2 BPSK scenarios, the scrambling sequence may be another m-sequence of the same or a different order.

According to still further aspects, the scrambling sequence may be a Gold code or sequence, which is determined based on the cell-specific scrambling ID. In a particular aspect, for a Gold sequence the scrambling ID is used to determine a random seed for generating the Gold sequence. Additionally, for an m-sequence, it is noted that the scrambling ID may be used to determine the location from which to derive the m-sequence from the generating sequence according to other aspects.

Figure 9:
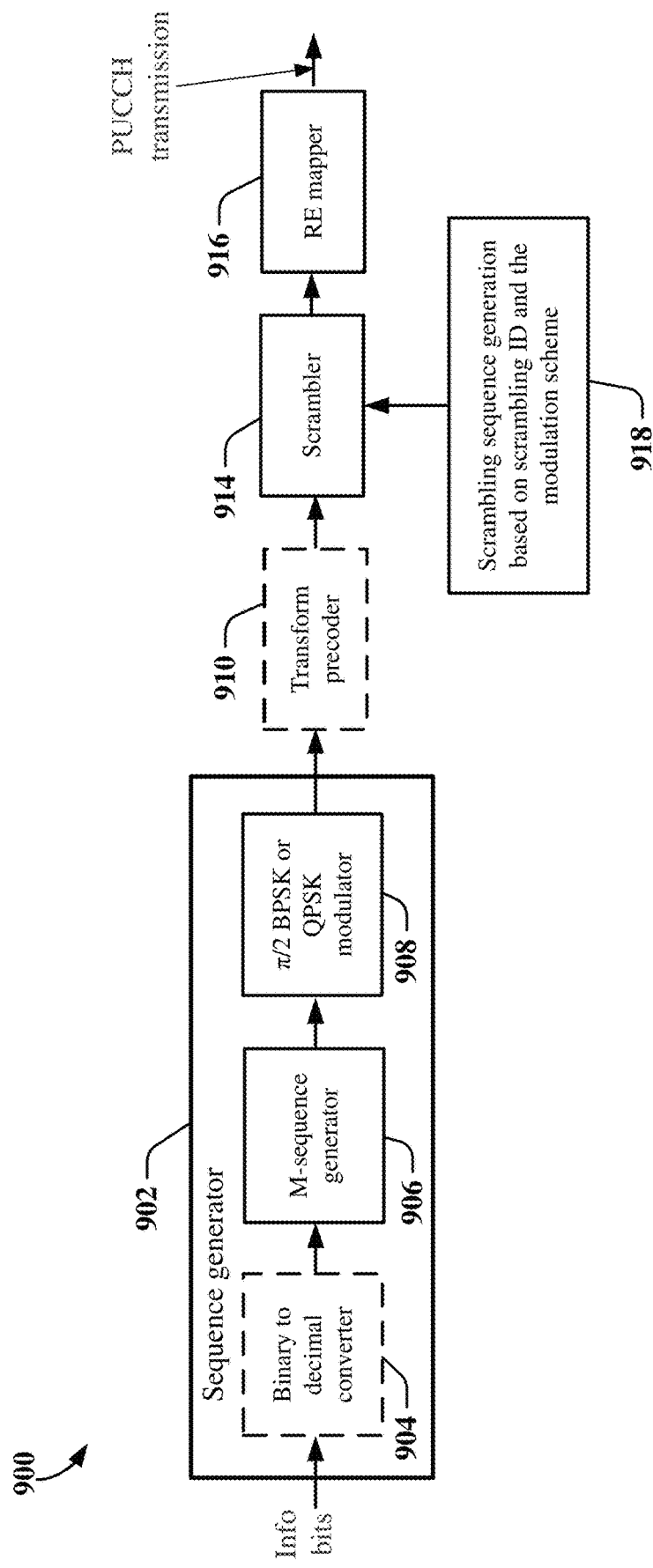
FIG. 9 illustrates yet another apparatus employing m-sequence generation for transmissions according to some aspects.

FIG. 9 illustrates a block diagram of an exemplary apparatus 900 for generating transmissions (e.g., PUCCH transmission) using m-sequences and also including the use of scrambling for mitigating either inter and/or intra cell interference. As shown, the apparatus 900 includes elements including a sequence generator 902 having a binary to decimal converter 904 similar to the apparatus of FIGS. 5A and 5B, or without this element as shown in the example of FIG. 5C, an m-sequence generator 906, a modulator 908 that is operable according to either π/2 BPSK or QPSK modulation, and an optional transform precoder 910. Apparatus 900 further includes a scrambler 914 that is configured to scramble the modulated m-sequence output by the sequence generator 902 prior to mapping to resource elements by the RE mapper 916.

A scrambling sequence generator 918 may be associated with or in communication with the scrambler 914. In particular, the scrambling sequence generator 918 may generate a scrambling sequence based on the scrambling ID (either UE or cell specific), a Gold sequence, or another QPSK sequence as was discussed above. Additionally, the choice of the scrambling sequence may be determined based on the type of modulation scheme that has been used in the modulator as was also discussed before.

Figure 10:
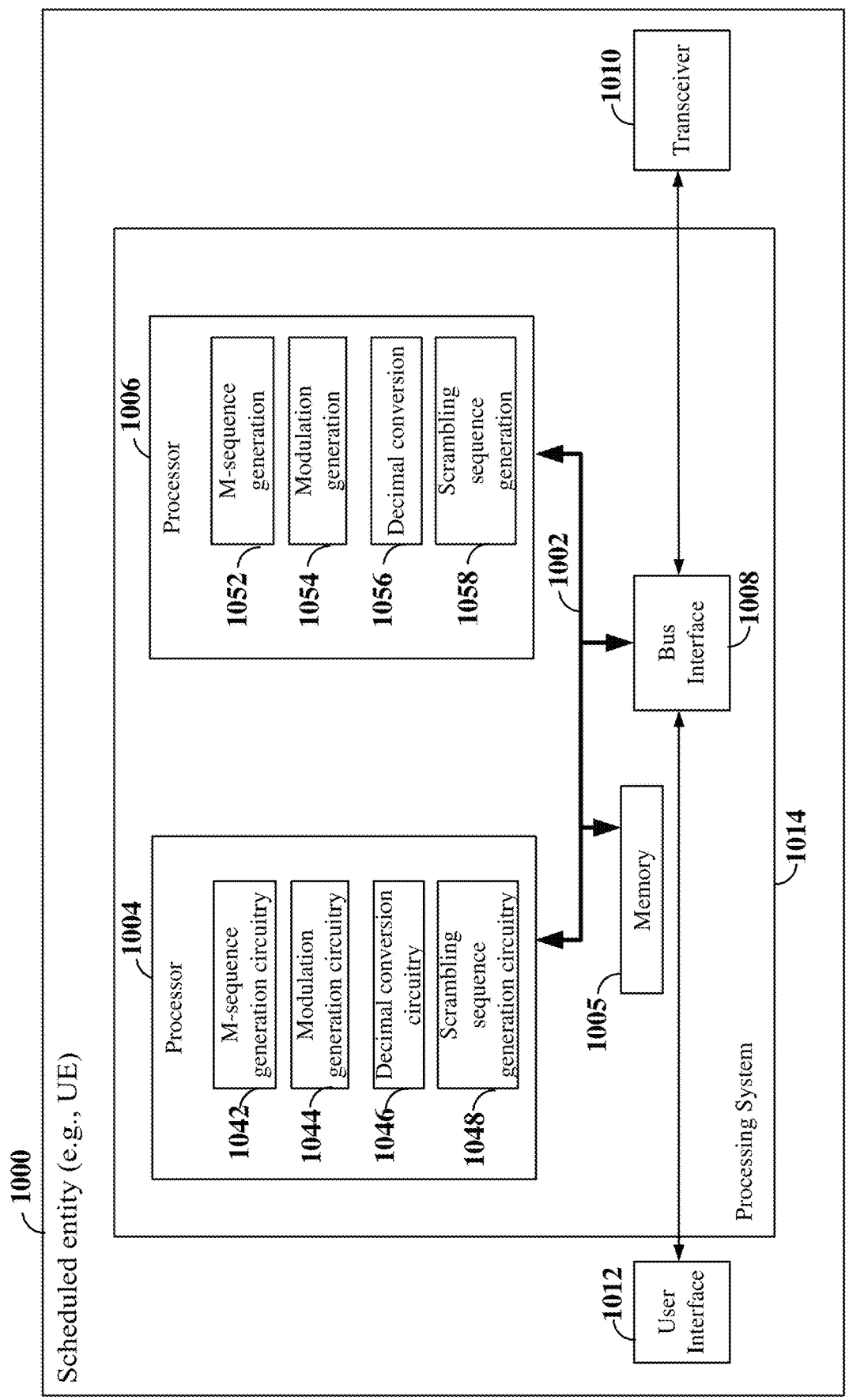
FIG. 10 is a block diagram illustrating an example of a hardware implementation for a scheduled entity (e.g., UE) employing a processing system according to some aspects.

FIG. 10 is a diagram illustrating an example of a hardware implementation for a wireless communication device 1000 employing a processing system 1014. For example, the wireless communication device 1000 may be a scheduled entity such as a user equipment (UE) or other device configured to wirelessly communicate with a base station, as discussed in FIG. 1, 2, or 8, as examples. In some implementations, the wireless communication device 1000 may correspond to one or more of the scheduled entity 106 (e.g., a UE, etc.) in FIG. 1, the UE 222, 224, 226, 228, 230, 232, 234, 238, 240, or 242 in FIG. 2, or the UE 810, 812, or 814 in FIG. 8.

The wireless communication device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1000 may be configured to perform any one or more of the functions described herein. That is, the processor 1004, as utilized in a wireless communication device 1000, may be used to implement any one or more of the processes and procedures described below.

The processor 1004 may in some instances be implemented via a baseband or modem chip and in other implementations, the processor 1004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and between the bus 1002 and a user interface 1012. The transceiver 1010 provides a communication interface or means for communicating with various other apparatus over a wireless transmission medium. In another aspect, the bus interface 1008 may be configured to provide a communication interface or means of communicating with various other apparatus and devices (e.g., other devices housed within the same apparatus as the wireless communication device or other external apparatus) over an internal bus or external transmission medium, such as an Ethernet cable. Depending upon the nature of the apparatus, a user interface 1012 (e.g., keypad, display, speaker, microphone, joystick) may also be provided. Of course, such a user interface 1012 is optional, and may be omitted in some examples, such as an IoT device.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 1000 may be configured to perform any one or more of the operations described herein (e.g., as described above in conjunction with FIGS. 4-9 and as described below in conjunction with FIG. 11). In some aspects of the disclosure, the processor 1004, as utilized in the wireless communication device 1000, may include circuitry configured for various functions.

The processor 1004 may include m-sequence generation circuitry 1042. The m-sequence generation circuitry 1042 may include one or more hardware components that provide the physical structure that performs various processes related to generating m-sequences as described herein, such as with respect to FIGS. 5A, 5B, 6, and 7. The m-sequence generation circuitry 1042 may further include one or more hardware components that provide the physical structure that performs various processes related to polynomial selection, initialization of the sequence generation, and selection of the start location as was discussed before. The m-sequence generation circuitry 1042 may further be configured to execute m-sequence generation software 1052 included on the computer-readable medium 1006 to implement one or more functions described herein.

The processor 1004 may include modulation circuitry 1044 configured to perform either π/2 BPSK or QPSK modulation as discussed herein. Additionally, the modulation circuitry 1044 may include hardware or physical structure for determining when to use a particular modulation scheme, which may be based on power transmission levels and the peak to average power ratio (PAPR). The modulation circuitry 1044 may be further configured to execute modulation software 1054 included on the computer-readable medium 1006 to implement one or more functions described herein.

The processor 1004 may include a decimal conversion circuitry 1046 configured to perform conversion of the binary payload (e.g., UCI bits) to decimal values as discussed herein. The decimal conversion circuitry 1046 may further be configured to execute decimal conversion software 1056 included on the computer-readable medium 1106 to implement one or more functions described herein.

The processor 1004 may also include a scrambling sequence generation circuitry 1048 configured to scrambling of the modulated m-sequences as discussed herein in connection with FIGS. 8 and 9. The scrambling sequence generation 1048 may further be configured to execute scrambling sequence generation software 1058 included on the computer-readable medium 1006 to implement one or more functions described herein.

Figure 11:
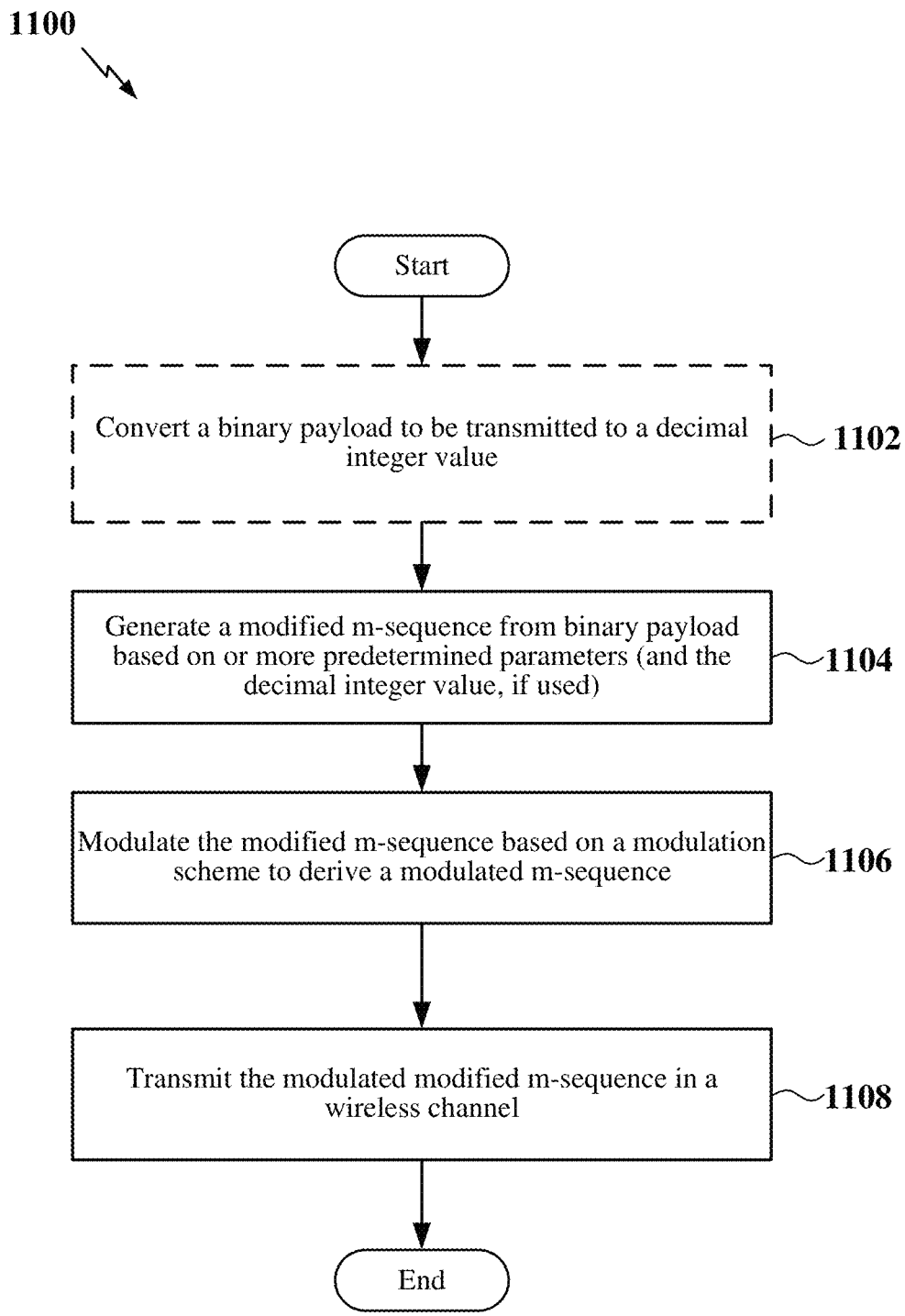
FIG. 11 is a flow chart illustrating a method for transmitting m-sequences in a UE according to some aspects.

FIG. 11 is a flow chart illustrating a method 1100 for a wireless communication system in accordance with some aspects. As described below, some or all illustrated features may be omitted in a particular implementation within the scope of the present disclosure, and some illustrated features may not be required for implementation of all examples. In some examples, the method 1100 may be carried out by the wireless communication device 1000 illustrated in FIG. 10, or also with the apparatus illustrated in FIGS. 1, 2, 5A-5C, 6, and/or 9. In some aspects, the wireless communication device may be a user equipment (UE). In some examples, the method 1100 may be carried out by any suitable apparatus or means for carrying out the functions or algorithm described below.

At block 1102, a wireless communication device such as a UE may convert a binary payload (i.e., information bits of the payload) to be transmitted to a decimal integer value. In an aspect, the decimal conversion circuitry 1046 shown and described above in connection with FIG. 10, converter 504 shown and described above in connection with FIGS. 5A and 5B, convertor 904 shown and described above in connection with in FIG. 9, or equivalents thereof, may provide means for converting a binary payload to be transmitted to a decimal integer value. Furthermore, the binary payload may include uplink control information (UCI) according to some aspects, but is not necessarily limited to such. As described above, in the case of the apparatus of FIG. 5C, this conversion process shown in block 1102 may not be needed in the case of an m-sequence generator based on an input UCI payload.

Next, method 1100 includes generating a modified m-sequence based on one or more predetermined parameters as shown at block 1104. In an aspect, the processes of block 1104 may include using the decimal integer value determined by the processes of optional block 1102, if conversion to the decimal integer value is utilized. In a further aspect, generator 506 shown and described above in connection with FIGS. 5A and 5B, generator 906 shown and described above in connection with FIG. 9, or m-sequence generation circuitry 1042 circuitry 1042 in FIG. 10, or equivalents thereof, may provide means for generating a modified m-sequence based on one or more predetermined parameters. Furthermore, the one or more predetermined parameters may include a polynomial of a particular order such as one of those polynomials shown in FIG. 7, a starting location, which may further be determined, established, or set through the use of an offset value (e.g., do), and an initialization sequence as discussed previously. According to further aspects, it is noted that the generation of the m-sequences may be implemented based on various options such as setting the m-sequences to order k, k+1 or $k_{max}$ as was discussed previously.

Method 1100 may further include in blocks 1102 and 1104 that the generation of the modified m-sequence includes converting the information bits of the payload to be transmitted to the decimal integer value, as well as generating the modified m-sequence based on at least the decimal integer value, wherein the modified m-sequence is limited to a predetermined sequence length. Additionally, the decimal integer value corresponds to a starting location of the modified m-sequence.

Once the m-sequence(s) is determined in block 1104, flow proceeds to block 1106 wherein the m-sequence(s) are modulation based on a modulation scheme to derive a modulated m-sequence. In an aspect, QPSK modulator 508 shown and described above in connection with FIG. 5A, π/2 BPSK modulator 524 shown and described above in connection with FIG. 5B, QPSK or π/2 BPSK modulator 908 shown and described above in connection with FIG. 9, or modulation generation circuitry 1044 shown and described above in connection with FIG. 10, or equivalents thereof, may provide means for modulating an m-sequence based on a modulation scheme to derive the modulated m-sequence. Additionally, the determination of the modulation scheme may be determined in a network or gNB and communicated to the UE via RRC messaging/signaling (which may include dynamic selection of modulation schemes based on network conditions), or established a priori.

In further aspects, method 1100 may that the generation of the modified m-sequence is based on either truncation of an m-sequence or repetition of the m-sequence. For example, modification my include truncating the m-sequence to obtain the modified m-sequence of a first predetermined sequence length, which will be less than original length of the m-sequence. In another example, the generation of modified m-sequence is accomplished by repeating the m-sequence to obtain the modified sequence of a second predetermined sequence length, where the second sequence length will be greater than length of the original m-sequence.

Furthermore, method 1100 includes transmitting the modulated m-sequence in a wireless channel as shown in block 1108. The processes in block 1108 may include various process such a transform precoding and RE mapping as were discussed previously in connection with FIGS. 5A, 5B, and 9 including mapping the modified m-sequence to one or more resource elements (REs) in at least one transmission slot prior to transmission of the modulated modified m-sequence in the wireless channel. Further, transmission in block 1108 may also include the use of scrambling as discussed in connection with FIGS. 8 and 9 (See also e.g., scrambler 914 and scrambling sequence generator 918). In a further aspect, the wireless channel may be a PUCCH channel transmitted from a UE to base station or gNB, but is not necessarily limited to such. According to still other aspects, the RE mapper 512 shown and described above in connection with FIGS. 5A and 5B, scramble 914, scrambling sequence generator 918, and RE mapper 916 shown and described above in connection with FIG. 9, and/or scrambling sequence generation circuitry 1048 and transceiver 1010 shown and described above in connection with FIG. 10, or equivalents thereof, may provide means for transmitting the modulated m-sequence in a wireless channel.

Figure 12:
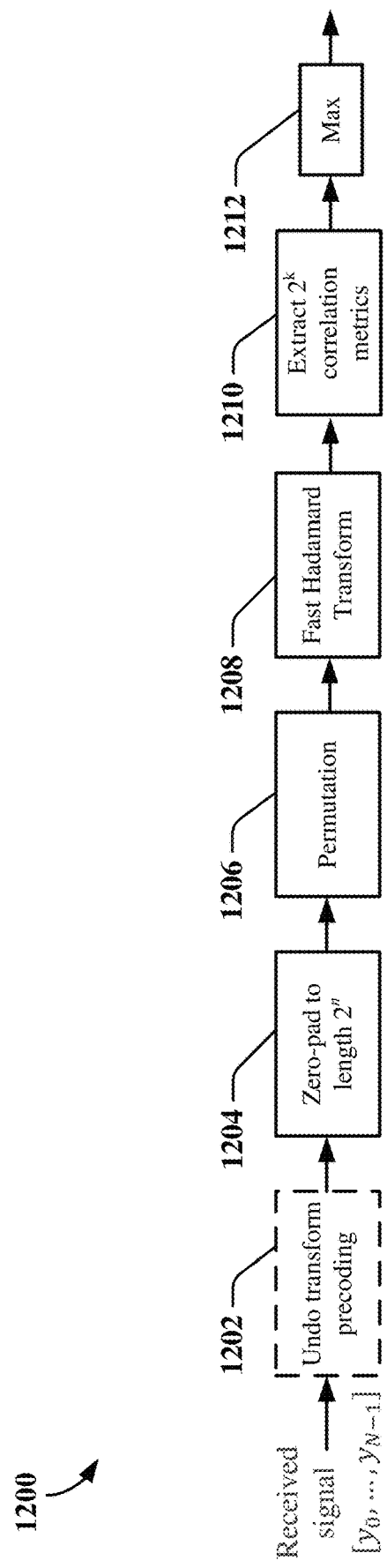
FIG. 12 is a block diagram of a receiving apparatus for receiving truncated m-sequence based transmissions according to some aspects.

As discussed before, an advantage of using m-sequence based design is that the complexity of detecting an m-sequence on a receiver side is much lower than designs used for detecting other types of sequences. FIG. 12 illustrates an exemplary receiver 1200 for receiving, detecting, and/or decoding the modified m-sequence based transmissions discussed above. It is noted that in order to detect a sequence at the receiver, the receiver 1200 correlates the received signal (denoted by $[y_0, \ldots, y_{N-1}]$) with all possible $2^k$ sequences as will be explained below.

As illustrated, the receiver 1200 includes an optional circuitry or software 1202 for undoing the transform precoding of the received signal, if transform precoding was performed at the transmitter. Further, receiver 1200 include a padding block 1204 configured to zero pad the received signal sequence to a length $2^n$, where n denotes the order of the polynomial that was used to generate the m-sequence. Padding is performed because the transmitted signal is a modified m-sequence.

Next, the receiver includes a permutation block 1206 for permuting the zero padded sequences from block 1204. After permuting the padded sequences in block 1206, a cross-correlation may be performed on the received sequences. In particular, it is noted that if each candidate m-sequence is viewed as a row vector and all candidate sequences are stacked together (i.e., multiple rows or row vectors for a total of $2^k$ sequences or row vectors), a matrix M of size $2^k \times 2^n$ may be created where 2n is the length of the received sequence after zero-padding. It is noted that, the order n of the polynomial that generates the m-sequence may not be the same as the number k of information bits transmitted by the transmitter. And the output of the Fast Hadamard transform in block 1208 has length $2^n$. A cross-correlation between a sequence and a received signal $Y=[y(0), \ldots, y(2^n-1)]$ is simply an inner-product, and therefore computing $2^k$ correlators is equivalent to the following matrix multiplication:

$$M \cdot Y^H \qquad (4)$$

where vector matrix $Y^H$ denotes the conjugate transpose (also known as the Hermitian transpose) of Y. The structure of the stacked m-sequences allows the matrix multiplication in (4) to be computed using a low complexity algorithm. In particular, the matrix multiplication of equation (4) may be performed by block 1208, which is labeled as a fast Hadamard transform and by block 1210, which is labeled as extracting $2^k$ correlation metrics, according to a particular aspect. In particular, if the sequences are m-sequences, then the multiplication of the Hermitian transpose $Y^H$ with the matrix M can be effectively computed via a fast Hadamard transformation where $2^n$ signals are output by block 1208.

Additionally, concerning the permutation operation performed by block 1206, it is noted that for a vector a of length $2^n$, the (Fast) Hadamard transformation of a is equivalent to H a, where H denotes the Hadamard matrix. In the detection of m-sequences, however, the computation of equation (4) (i.e., $M \cdot Y^H$) is performed with matrix M where M is the matrix generated by stacking the m-sequences together. The Hadamard matrix H used in the computation can be obtained by permuting the columns of M. Therefore, in order to compute $M \cdot Y^H$, the signal Y may be first permuted to obtain a permuted version of Y (which may be denoted as matrix "Z"), and then multiplying Z with H wherein $M \cdot Y^H = H \cdot Z^H$. Accordingly, Y is permuted at block 1206 before taking the fast Hadamard transform in block 1208.

After the cross-correlation in block 1208, a $2^k$ number of correlation metrics may be extracted from the $2^n$ output signals of the fast Hadamard transform 1208, as represented by block 1210. These $2^k$ correlation metrics correspond to the correlation between the received signal y and each of the $2^k$ candidate sequences. More specifically, if k bits are transmitted in the transmitter, the transmitter will pick one sequence from $2^k$ sequences based on the k bits payload and transmit. The receiver, after receiving the signal, will need to determine which one of the $2^k$ candidate sequences is transmitted by the transmitter. Accordingly, the receiver may make this determination by computing the cross-correlation between the received signal and each of the $2^k$ candidate sequences, and deciding the candidate sequence that yields the maximum cross-correlation.

The reason for extracting correlation metrics is due to the transmitter having transmitted k bits, and therefore the receiver needs to compute $2^k$ correlation metrics. However, as discussed before, the order n of the m-sequence could be greater than k due to truncation and scrambling. As a consequence, the Fast Hadamard transform in the block 1208 may yield $2^n$ values. Accordingly, the receiver needs to determine which $2^k$ values from the $2^n$ computed values correspond to the $2^k$ correlation metrics.

Finally, these correlation metrics determined in block 1210 are then input to a max block 1212, which is used to determine the maximum of the $2^k$ correlation metrics. In particular, the receiver will determine that the candidate sequence that yields the maximum correlation to be the one that is transmitted by the transmitter. This sequence will be the final detected sequence at the receiver and output from block 1212. If the detected sequence is the same as the transmitted sequence, then the detection is correct. Otherwise, an error has occurred, and the receiver will not be able to recover the UCI bits correctly. For example, if k=2, and there are four possible sequences, e.g., $x_1$, $x_2$, $x_3$, and $x_4$. The receiver will need to compute the cross-correlation between each of $x_1$, $x_2$, $x_3$, and $x_4$ sequences and the received y signal. If the correlation metric is denoted by $a_1$, $a_2$, $a_3$, and $a_4$ and correlate to the respective $x_1$, $x_2$, $x_3$, and $x_4$, the receiver will check for the maximum from among $a_1$, $a_2$, $a_3$, and $a_4$. If $a_1$ is the maximum, then the receiver determines that $x_1$ is the transmitted sequence. Likewise, if $a_2$ is the maximum, then receiver detects that $x_2$ is the transmitted sequence, and so on.

Figure 13:
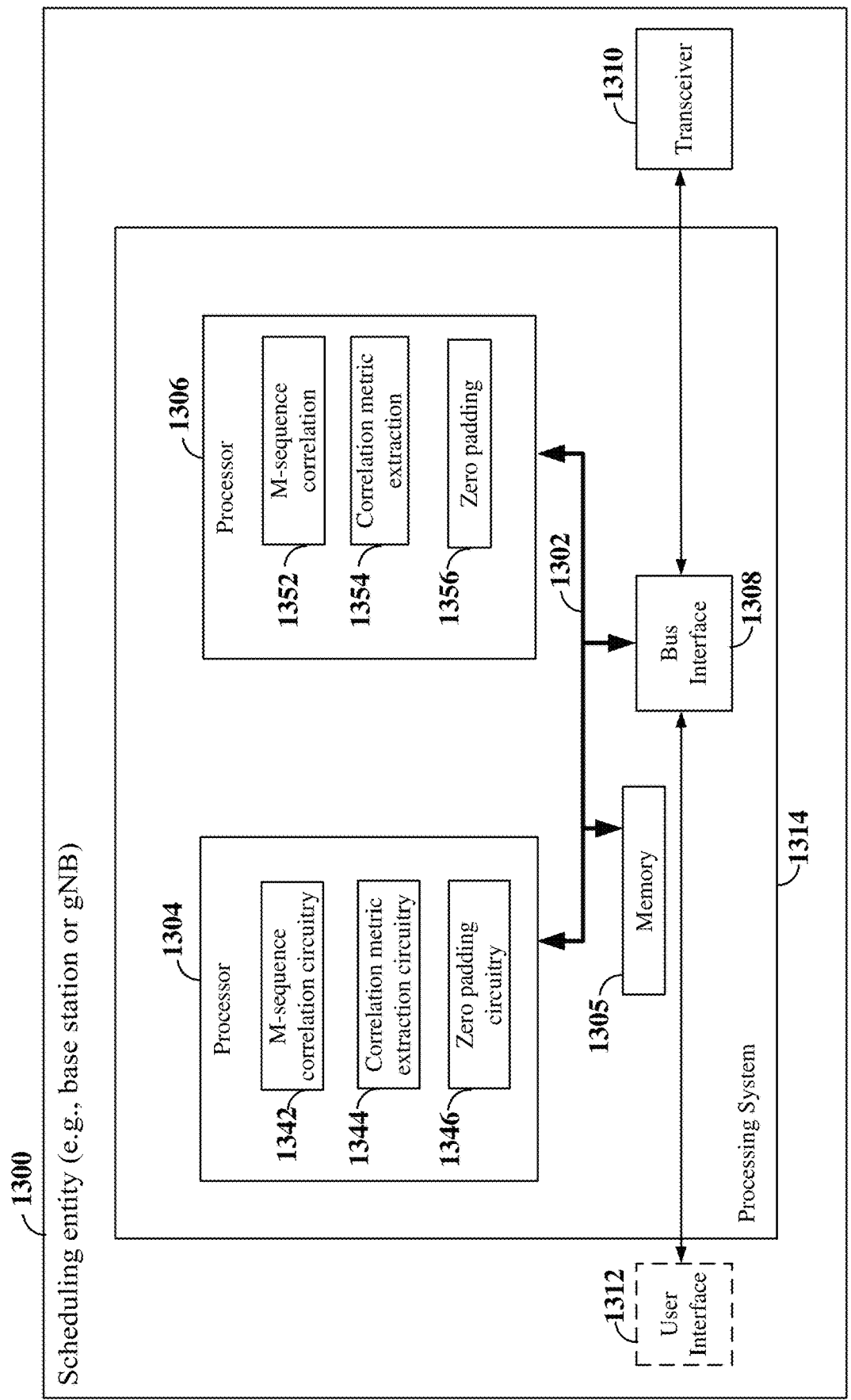
FIG. 13 is a block diagram illustrating an example of a hardware implementation for a scheduling entity (e.g., base station or gNB) employing a processing system according to some aspects.

FIG. 13 is a block diagram illustrating an example of a hardware implementation for a scheduling entity 1300 employing a processing system 1314. For example, the scheduling entity 1300 may be a scheduling entity such as a base station, gNB, or other device configured to wirelessly communicate with a UE, as discussed in FIG. 1, 2, or 8, as examples. In some implementations, the wireless communication device 1300 may correspond to one or more of the scheduling entity 108 (e.g., a base station, etc.) in FIG. 1, the base stations 210 or 212, or RRH 216 in FIG. 2, or the gNBs 806 or 808 in FIG. 8 as some examples.

The scheduling entity 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1300 may be configured to perform any one or more of the functions described herein. That is, the processor 1304, as utilized in a scheduling entity 1300, may be used to implement any one or more of the processes and procedures described herein.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides one or more communication interfaces or means for communicating with various other apparatus over a transmission medium (e.g., air, wire) over a plurality of communications interfaces. Depending upon the nature of the apparatus, a user interface 1312 (e.g., keypad, display, speaker, microphone, joystick, touchscreen) may also be provided. Of course, such a user interface 1312 is optional, and may be omitted in some examples.

The processor 1304 is responsible for managing the bus 1302 and general processing, including the execution of software stored on the computer-readable medium 1306. The software, when executed by the processor 1304, causes the processing system 1314 to perform the various functions described herein for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1304 may include circuitry configured for various functions. In one example, the processor 1304 may include m-sequence correlation circuitry 1342 configured to correlate received m-sequence based transmissions to determine error correction and channel coding, as one example. In an example, m-sequence correlation circuitry 1342 may include fast Hadamard transforms to effectuate the cross-correlation as discussed earlier with regard to FIG. 12. In addition, the m-sequence correlation circuitry 1342 may further be configured to execute m-sequence correlation software 1352 included on the computer-readable medium 1306 to implement one or more of the functions described herein.

In some further aspects, the processor 1304 may include correlation metric extraction circuitry 1344 configured to extract $2^k$ correlation metrics such as is performed at block 1210 in FIG. 12, as one example. In addition, correlation metric extraction circuitry 1344 may further be configured to execute correlation metric extraction software 1354 included on the computer-readable medium 1306 to implement one or more of the functions described herein.

In some further aspects, the processor 1304 may include zero padding circuitry 1346 configured to add zero padding to the received modified m-sequence based transmissions. In an example, zero padding circuitry 1346 may be configured to zero-pad the received signal y(0), . . . , y(N−1) to length $2^n$, with n denoting the order of the polynomial that generates the m-sequence transmissions. In addition, the zero padding circuitry 1346 may further be configured to execute zero padding software 1356 included on the computer-readable medium 1306 to implement one or more of the functions described herein.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one of the FIGS. 1, 2, 8, and 12 utilizing, for example, the processes and/or algorithms described herein in relation to FIG. 13.

Figure 14:
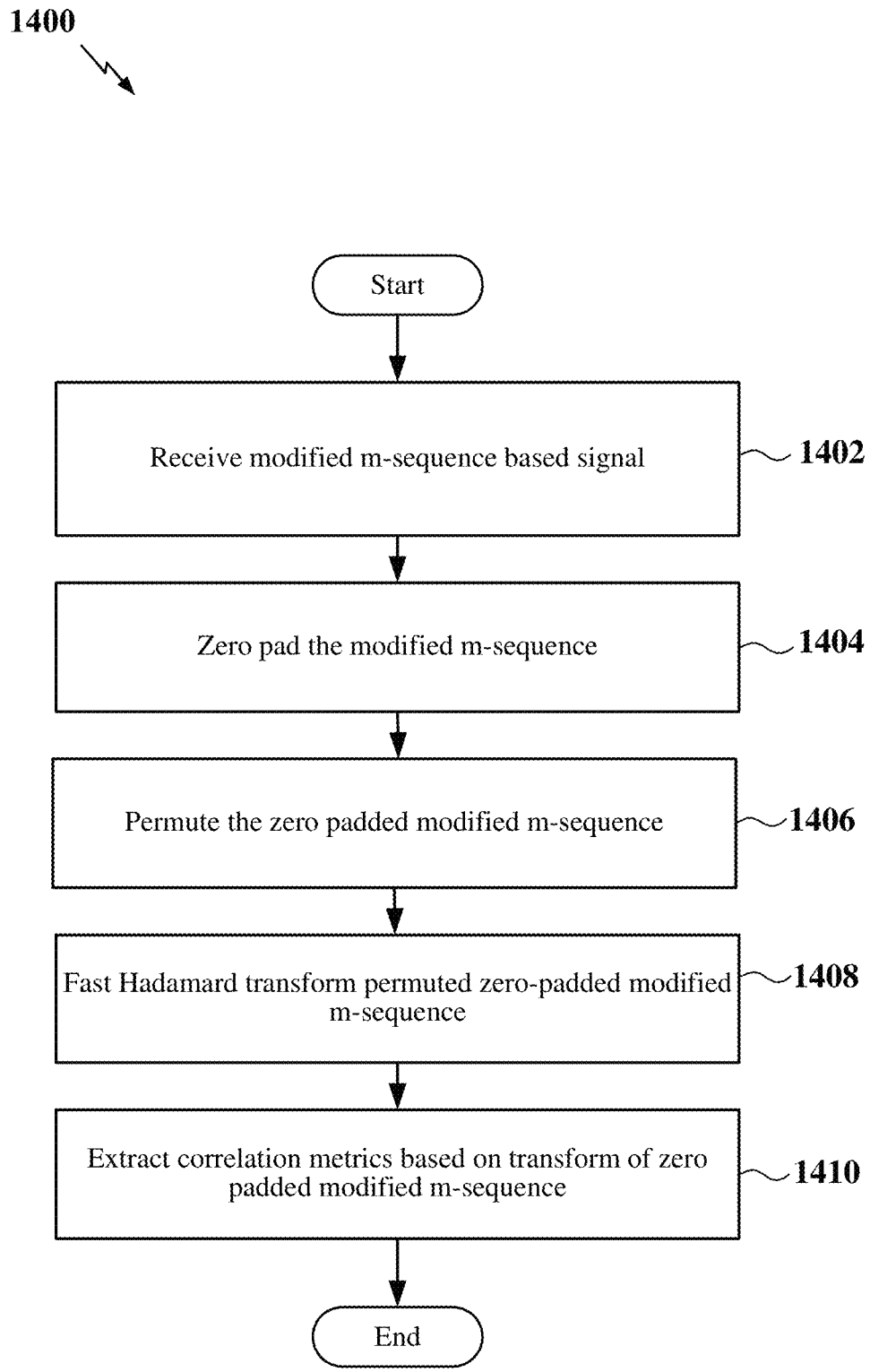
FIG. 14 is a flow chart illustrating a method for receiving m-sequences in a base station or gNB according to some aspects.

FIG. 14 is a flow chart illustrating a method 1400 for a wireless communication system in accordance with some aspects. As described below, some or all illustrated features may be omitted in a particular implementation within the scope of the present disclosure, and some illustrated features may not be required for implementation of all examples. In some examples, the method 1400 may be carried out by the wireless communication device 1300 illustrated in FIG. 13, or also with the apparatus illustrated in FIGS. 1, 2, and/or 9. In some aspects, the wireless communication device may be a user equipment (UE). In some examples, the method 1400 may be carried out by any suitable apparatus or means for carrying out the functions or algorithm described below.

Method 1400 includes receiving an m-sequence based signal such as a PUCCH (and UCI information therein) as shown at block 1402. In an aspect, the m-sequence is a modified sequence. In a further aspect, block 1202 shown and described above in connection with FIG. 12, transceiver 1310 shown and described above in connection with FIG. 13, or equivalents thereof, may provide means for receiving a modified m-sequence based signal.

Next, method 1400 may include zero padding the received modified m-sequence, to increase the length of the received signal to a length $2^n$, where n denotes the order of the polynomial that generated the m-sequence at the transmitter as shown in block 1404. In an aspect, zero padding block 1204 shown and described above in connection with FIG. 12, zero padding circuitry 1346 shown and described above in connection with FIG. 13, or equivalents thereof, may provide means for zero padding the received modified m-sequence.

Additionally, method 1400 includes permuting the zero padded modified m-sequence as shown in block 1406. In an aspect, permutation 1206 shown and described above in connection with FIG. 12, zero padding circuitry 1346 shown and described above in connection with FIG. 13, or equivalents thereof, may also provide means for permuting the zero padded m-sequence.

Next, method 1400 includes fast Hadamard transforming the permuted zero-padded modified m-sequence as shown at block 1408. In an aspect, fast Hadamard transform block 1208 shown and described above in connection with FIG. 12, m-sequence correlation circuitry 1342 shown and described above in connection with FIG. 13, or equivalents thereof, may also provide means for fast Hadamard transforming the permuted zero-padded modified m-sequence.

Further, method 1400 includes a block 1410 that effects extracting correlation metrics based on the result of the fast Hadamard transform accomplished in block 1408. In an aspect, extraction block 1210 shown and described above in connection with FIG. 12, correlation metric extraction circuitry 1344 shown and described above in connection with FIG. 13, or equivalents thereof, may also provide means for extracting correlation metrics based on the result of the fast Hadamard transform.

In yet further aspects, method 1300 may further include that the base station (e.g., UE 1300) selects a modulation scheme usable by the UE for generating the modified m-sequence, and sends one of radio resource control (RRC) signaling or downlink control information (DCI) to UE configured for indicating the selection of the modulation scheme.

Several aspects of a wireless communication network have been presented with reference to an exemplary implementation. As those skilled in the art will readily appreciate, various aspects described throughout this disclosure may be extended to other telecommunication systems, network architectures and communication standards.

The following provides an overview of aspects of the present disclosure:

Aspect 1: A method for wireless communication at a user equipment (UE) in a communications network, the method comprising: generating a modified maximum sequence (m-sequence) from information bits of a payload to be transmitted based on one or more predetermined parameters; modulating the modified m-sequence based on a modulation scheme to derive a modulated modified m-sequence; and transmitting the modulated modified m-sequence in a wireless channel.

Aspect 2: The method of aspect 1, wherein the generating the modified m-sequence further comprises: converting the information bits of the payload to be transmitted to a decimal integer value; and generating the modified m-sequence based on at least the decimal integer value, wherein the modified m-sequence is limited to a predetermined sequence length.

Aspect 3: The method of aspect 2, wherein the decimal integer value corresponds to a starting location of the modified m-sequence.

Aspect 4: The method of any of aspects 1 through 3, wherein the generating the modified m-sequence comprises one of: truncating an m-sequence to obtain the modified m-sequence of a first predetermined sequence length; or repeating the m-sequence to obtain the modified sequence of a second predetermined sequence length.

Aspect 5: The method of any of aspects 1 through 4, wherein the wireless channel is a sequence based physical uplink control channel (PUCCH).

Aspect 6: The method of any of aspects 1 through 5, wherein the information bits of the payload to be transmitted comprises uplink control information (UCI).

Aspect 7: The method of any of aspects 1 through 6, wherein the modulation scheme includes one of a π/2 binary phase-shift keying (BPSK) modulation scheme or a quadrature phase-shift keying (QPSK) modulation scheme.

Aspect 8: The method of any of aspects 1 through 7, wherein the transmitting the modulated modified m-sequence further comprises: mapping the modified m-sequence to one or more resource elements (REs) in at least one transmission slot prior to transmission of the modulated modified m-sequence in the wireless channel.

Aspect 9: The method of any of aspects 1 through 8, wherein the transmitting the modulated modified m-sequence further comprises: transform precoding the modulated modified m-sequence prior to transmission of the modulated modified m-sequence in the wireless channel.

Aspect 10: The method of any of aspects 1 through 9, wherein the one or more predetermined parameters include at least one of an initialization sequence for the modified m-sequence, a starting location for the modified m-sequence, and a polynomial expression of a particular order used for determination of the modified m-sequence.

Aspect 11: The method of any of aspects 1 through 10, wherein the one or more predetermined parameters include a preconfigured offset value configured for setting a starting location of the modified m-sequence.

Aspect 12: The method of any of aspects 1 through 11, further comprising: using a plurality of modified m-sequences of a predetermined order of a generating polynomial to convey a k number of bits of the information bits of the payload to be transmitted.

Aspect 13: The method of aspect 12, further comprising: setting the predetermined order for the plurality of modified m-sequences equal to the value of k; utilizing a $2^k-1$ number of modified m-sequences of order k in the plurality of truncated m-sequences; and adding one additional sequence to the number of $2^k-1$ of modified m-sequences for conveying the k number of bits.

Aspect 14: The method of aspect 13, wherein the one additional sequence comprises one of an all zero sequence or an all one sequence.

Aspect 15: The method of any of aspects 1 through 12, further comprising setting a preconfigured offset value configured for setting a starting location of the modified m-sequence to a value of zero wherein no offset is used.

Aspect 16: The method of aspect 12, further comprising: setting the predetermined order for the plurality of truncated m-sequences equal to a value k+1; and utilizing a subset of a $2^{k+1}-1$ number of modified m-sequences of order k+1 for the plurality of modified m-sequences, wherein the subset is determined by an offset value configured for setting a starting location of the modified m-sequence.

Aspect 17: The method of aspect 11 or aspect 16, wherein the offset value is set in the wireless device by a base station through radio resource control (RRC) signaling.

Aspect 18: The method of aspect 12, further comprising: setting the predetermined order for the plurality of modified m-sequences equal to a maximum k value ($k_{max}$); wherein $k_{max} \geq k$ and is an integer number that is independent of k; and selecting a set of $2^k$ modified m-sequences from the total number of $2^{k_{max}}-1$ modified m-sequences of modified m-sequences of order $k_{max}$ in the plurality of modified m-sequences, wherein the set is further selected by selecting a subsequence starting from a value $x(d+d_0)$ where d is a decimal integer, and $d_0$ is a predetermined offset value.

Aspect 19: The method of aspect 12, further comprising: setting the predetermined order for the plurality of modified m-sequences equal to a maximum k value ($k_{max}$); wherein $k_{max} \geq k$ and is an integer number that is independent of k; and selecting of a set of $2^k$ modified m-sequences from the total number of $2^{k_{max}}-1$ modified m-sequences of modified m-sequences of order $k_{max}$ in the plurality of modified m-sequences, wherein the set is further selected by selecting a subsequence starting from a value $x(\eta \cdot d+d_0)$ where value $\eta$ is selected from a power of two sequence, d is a decimal integer, and $d_0$ is a predetermined offset value.

Aspect 20: The method of any of aspects 1 through 19, further comprising: scrambling the modulated modified m-sequence with a predetermined scrambling sequence prior to the transmitting the modulated modified m-sequence.

Aspect 21: The method of aspect 20, wherein the predetermined scrambling sequence comprises one of: a binary sequence having a length equal to the modified m-sequence for a $\pi/2$ binary phase-shift keying (BPSK) modulation scheme; or a quadrature phase-shift keying (QPSK) modulated binary sequence having a length equal to the modified m-sequence for a QPSK modulation scheme.

Aspect 22: The method of aspect 21, wherein the predetermined scrambling sequence comprises a Gold sequence that is determined based on a cell-specific scrambling ID.

Aspect 23: The method of aspect 22, wherein the scrambling ID is used to determine a random seed for generating the Gold sequence.

Aspect 24: The method of aspect 20, wherein the predetermined scrambling sequence is a scrambling modified m-sequence determined based on a cell-specific scrambling ID.

Aspect 25: The method of any of aspects 1 through 25, further comprising: receiving control signaling from a base station configured to indicate a selection of the modulation scheme.

Aspect 26: The method of aspect 25, wherein the control signaling comprises one of radio resource control (RRC) signaling or downlink control information (DCI).

Aspect 27: A UE or scheduled entity configured for wireless communication comprising a processor, and a memory coupled to the processor, the processor and memory configured to perform a method of any of aspects 1 through 26.

Aspect 28: A method of wireless communication in a base station in a wireless communication network, the method comprising: receiving a modified maximum sequence (m-sequence) signal from a user equipment (UE); zero padding the received modified m-sequence to increase the length of the received sequence to a length $2^n$, where n denotes the order of a polynomial that generated the modified m-sequence to derive a zero padded m-sequence; permuting the zero padded m-sequence; fast Hadamard transforming the permuted zero-padded m-sequence; and extracting correlation metrics based on a result of the fast Hadamard transform.

Aspect 29: The method of aspect 28, further comprising: selecting a modulation scheme usable by the UE for generating the modified m-sequence; and sending one of radio resource control (RRC) signaling or downlink control information (DCI) to UE configured for indicating the selection of the modulation scheme.

Aspect 30: A base station, gNB, or network entity configured for wireless communication comprising a processor, and a memory coupled to the processor, the processor and memory configured to perform the method of either aspect 28 or aspect 29.

Aspect 31: An apparatus configured for wireless communication comprising at least one means for performing a method of any one of aspects 1 through 26 or aspects 28 through 29.

Aspect 32: A non-transitory computer-readable medium storing computer-executable code, comprising code for causing an apparatus to perform a method of any one of aspects 1 through 26 or aspects 28 through 29.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more."

Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication in a user equipment (UE), the method comprising:
   generating at least one modified maximum sequence (m-sequence) from information bits of a payload to be transmitted based on a generating polynomial, the generating polynomial having an order based on a number k of information bits of the payload to be transmitted, and wherein the order is greater than k;
   modulating the at least one modified m-sequence based on a modulation scheme to derive at least one modulated modified m-sequence; and
   transmitting the at least one modulated modified m-sequence.

2. The method of claim 1, wherein the generating the at least one modified m-sequence further comprises:
   converting the information bits of the payload to be transmitted to a decimal integer value; and
   generating the at least one modified m-sequence based on at least the decimal integer value, wherein the at least one modified m-sequence is limited to a predetermined sequence length.

3. The method of claim 1, wherein the generating the at least one modified m-sequence comprises one of:
   truncating at least one m-sequence to obtain the at least one modified m-sequence of a first predetermined sequence length; or
   repeating the at least one m-sequence to obtain the at least one modified sequence of a second predetermined sequence length.

4. The method of claim 1, wherein the at least one modulated modified m-sequence is transmitted on a sequence based physical uplink control channel (PUCCH).

5. The method of claim 1, wherein the information bits of the payload to be transmitted comprises uplink control information (UCI).

6. The method of claim 1, wherein the modulation scheme includes one of a π/2 binary phase-shift keying (BPSK) modulation scheme or a quadrature phase-shift keying (QPSK) modulation scheme.

7. The method of claim 1, wherein the transmitting the at least one modulated modified m-sequence further comprises:
   mapping the at least one modified m-sequence to one or more resource elements (REs) in at least one transmission slot prior to transmission of the modulated modified m-sequence.

8. The method of claim 1, wherein the transmitting the at least one modulated modified m-sequence further comprises:

transform precoding the at least one modulated modified m-sequence prior to transmission of the modulated modified m-sequence.

9. The method of claim 1, wherein generating the at least one m-sequence is further based on at least one of an initialization sequence for the at least one modified m-sequence and a starting location for the at least one modified m-sequence.

10. The method of claim 1, wherein generating the at least one m-sequence is further based on a preconfigured offset value configured for setting a starting location of the at least one modified m-sequence.

11. The method of claim 1, further comprising:
using a plurality of modified m-sequences to convey the information bits of the payload to be transmitted.

12. The method of claim 11, further comprising setting a preconfigured offset value configured for setting a starting location of the at least one modified m-sequence to a value of zero wherein no offset is used.

13. The method of claim 11, further comprising:
setting the order for the plurality of modified m-sequences equal to a value k+1; and
utilizing a subset of a $2^{k+1}-1$ number of modified m-sequences of order k+1 for the plurality of modified m-sequences, wherein the subset is determined by an offset value configured for setting a starting location of the modified m-sequence.

14. The method of claim 13, wherein the offset value is set in the UE by a network node through radio resource control (RRC) signaling.

15. The method of claim 11, further comprising:
setting the order for the plurality of modified m-sequences equal to a maximum k value ($k_{max}$); wherein $k_{max} \geq k$ and is an integer number that is independent of k; and
selecting a set of $2^k$ modified m-sequences from a total number of $2^{k_{max}}-1$ modified m-sequences of modified m-sequences of order $k_{max}$ in the plurality of modified m-sequences, wherein the set is further selected by selecting a subsequence starting from a value $x(d+d_0)$ where d is a decimal integer, and $d_0$ is a predetermined offset value.

16. The method of claim 11, further comprising:
setting the order for the plurality of modified m-sequences equal to a maximum k value ($k_{max}$); wherein $k_{max} \geq k$ and is an integer number that is independent of k; and
selecting of a set of $2^k$ modified m-sequences from a total number of $2^{k_{max}}-1$ modified m-sequences of modified m-sequences of order $k_{max}$ in the plurality of modified m-sequences, wherein the set is further selected by selecting a subsequence starting from a value $x(\eta \cdot d+d_0)$ where value $\eta$ is selected from a power of two sequence, d is a decimal integer, and $d_0$ is a predetermined offset value.

17. The method of claim 1, further comprising:
scrambling the at least one modulated modified m-sequence with a predetermined scrambling sequence prior to the transmitting the at least one modulated modified m-sequence.

18. The method of claim 17, wherein the predetermined scrambling sequence comprises one of:
a binary sequence having a length equal to the at least one modified m-sequence for a $\pi/2$ binary phase-shift keying (BPSK) modulation scheme; or
a quadrature phase-shift keying (QPSK) modulated binary sequence having a length equal to the at least one modified m-sequence for a QPSK modulation scheme.

19. The method of claim 17, wherein the predetermined scrambling sequence comprises a Gold sequence that is determined based on a cell-specific scrambling ID.

20. The method of claim 19, wherein the scrambling ID is used to determine a random seed for generating the Gold sequence.

21. The method of claim 17, wherein the predetermined scrambling sequence is a scrambling modified m-sequence determined based on a cell-specific scrambling ID.

22. The method of claim 1, further comprising:
receiving control signaling from a base station configured to indicate a selection of the modulation scheme.

23. The method of claim 22, wherein the control signaling comprises one of radio resource control (RRC) signaling or downlink control information (DCI).

24. The method of claim 2, wherein the decimal integer value corresponds to a starting location of the at least one modified m-sequence.

25. A user equipment (UE), comprising:
one or more memories; and
one or more processors communicatively coupled to the one or more memories, wherein the one or more processors are configured to:
generate at least one modified maximum sequence (m-sequence) from information bits of a payload to be transmitted based on a generating polynomial, the generating polynomial having an order based on a number k of information bits of the payload to be transmitted, and wherein the order is greater than k;
modulate the at least one modified m-sequence based on a modulation scheme to derive at least one modulated m-sequence; and
transmit the at least one modulated modified m-sequence.

26. A method of wireless communication in a network node, the method comprising:
receiving a modified maximum sequence (m-sequence) signal from a user equipment (UE);
zero padding the received modified m-sequence to increase the length of the received sequence to a length $2^n$, where n denotes the order of a polynomial that generated the modified m-sequence to derive a zero padded m-sequence;
permuting the zero padded m-sequence;
fast Hadamard transforming the permuted zero-padded m-sequence; and
extracting correlation metrics based on a result of the fast Hadamard transform.

27. The method of claim 26, further comprising:
selecting a modulation scheme usable by the UE for generating the modified m-sequence; and
sending one of radio resource control (RRC) signaling or downlink control information (DCI) to the UE configured for indicating the selection of the modulation scheme.

28. A network node comprising:
one or more memories; and
one or more processors communicatively coupled to the one or more memories, wherein the one or more processors are configured to:
receive a modified m-sequence based signal from a user equipment (UE);
zero pad the received modified m-sequence to increase the length of the received sequence to a length $2^n$, where n denotes the order of a polynomial that generated the m-sequence to derive zero padded m-sequence;

permute the zero padded m-sequence;
fast Hadamard transform the permuted zero-padded m-sequence; and
extract correlation metrics based on a result of the fast Hadamard transform.

* * * * *